US006282370B1

(12) United States Patent
Cline et al.

(10) Patent No.: US 6,282,370 B1
(45) Date of Patent: Aug. 28, 2001

(54) CONTROL SYSTEM FOR BATHERS

(75) Inventors: David J. Cline, Newport Beach; Cindy Otto, Fountain Valley; Stefan Daystrom, Los Angeles, all of CA (US)

(73) Assignee: Balboa Instruments, Inc., Tustin, CA (US)

( * ) Notice: Subject to any disclaimer, the term of this patent is extended or adjusted under 35 U.S.C. 154(b) by 0 days.

(21) Appl. No.: 09/335,309

(22) Filed: Jun. 16, 1999

Related U.S. Application Data
(60) Provisional application No. 60/099,201, filed on Sep. 3, 1998.

(51) Int. Cl.[7] .................................................... F29H 1/10
(52) U.S. Cl. ........................ 392/465; 392/466; 392/485; 392/498
(58) Field of Search ................................... 392/465, 466, 392/485, 488, 492, 497, 498, 463; 219/482, 489, 492, 494, 497, 509

(56) References Cited

U.S. PATENT DOCUMENTS

| 4,204,204 | 5/1980 | Pitstick | 340/712 |
|---|---|---|---|
| 4,215,398 | 7/1980 | Burkett et al. | 364/101 |
| 4,322,297 | 3/1982 | Bajka | 210/742 |
| 4,340,852 | 7/1982 | Togneri | 324/538 |
| 4,368,549 | 1/1983 | Ramey | 4/493 |

(List continued on next page.)

FOREIGN PATENT DOCUMENTS

| 29519212 U | 1/1996 | (DE) . |
|---|---|---|
| 29600914 U | 3/1996 | (DE) . |

(List continued on next page.)

OTHER PUBLICATIONS

International Search Report for PCT Application No. US 99/19720, mailed Jan. 12, 2000.
International Search Report for PCT Application No. US 99/19716, mailed Jan. 12, 2000.

(List continued on next page.)

*Primary Examiner*—Philip H. Leung
*Assistant Examiner*—Thor Campbell
(74) *Attorney, Agent, or Firm*—Larry K. Roberts

(57) ABSTRACT

A control system for bathers includes an electronic controller which controls operation of an electric heater assembly connected in a water flow path for heating water. The heater assembly includes a heater housing and electric heater element. A solid state water temperature sensor apparatus provides electrical temperature signals to the controller indicative of water temperature at separated first and second locations on or within the heater housing. The presence of water in the heater housing is detected electronically, by turning on the heater, and monitoring the temperature sensors for unusual temperature rises or other faults for a period of time thereafter. A solid state water presence sensor apparatus can also be used to determine the presence of water within the heater housing, providing electrical water presence signals to the controller indicative of the presence or absence of a body of water within the heater housing. An independent circuit apparatus is connected to the water temperature sensor apparatus and to a power relay, automatically causing high voltage power to be disconnected from the heater assembly when the water temperature exceeds a predetermined temperature. The independent circuit apparatus requiring a manual reset once the water temperature has dropped below a predetermined level to allow the high voltage power to be reconnected to the heater assembly. The system includes ground continuity detection, ground current detection and ground fault detection circuits.

41 Claims, 19 Drawing Sheets

U.S. PATENT DOCUMENTS

| | | | |
|---|---|---|---|
| 4,381,031 | 4/1983 | Whitaker et al. | 165/39 |
| 4,385,724 | 5/1983 | Ramsauer et al. | 236/25 |
| 4,398,789 | 8/1983 | Pryor | 350/96.1 |
| 4,404,697 | 9/1983 | Hatcher | 4/492 |
| 4,406,550 | 9/1983 | Gray | 374/110 |
| 4,409,694 | 10/1983 | Barrett, Sr. et al. | 4/545 |
| 4,410,791 | 10/1983 | Eastep | 219/307 |
| 4,421,270 | 12/1983 | Raleigh et al. | 236/20 |
| 4,527,246 | 7/1985 | Masson | 364/505 |
| 4,563,780 | 1/1986 | Pollack | 4/192 |
| 4,564,962 | 1/1986 | Castleberry et al. | 4/543 |
| 4,621,613 | 11/1986 | Krumhansl | 126/416 |
| 4,682,728 | 7/1987 | Oudenhoven et al. | 236/12.12 |
| 4,693,415 | 9/1987 | Sturm | 236/12.12 |
| 4,696,428 | 9/1987 | Shakalis | 236/12.12 |
| 4,711,392 | 12/1987 | Kidouchi et al. | 236/12.12 |
| 4,713,525 | 12/1987 | Eastep | 219/308 |
| 4,757,943 | 7/1988 | Sperling et al. | 236/12.12 |
| 4,763,365 | 8/1988 | Gerondale et al. | 4/542 |
| 4,768,705 | 9/1988 | Tsutsui et al. | 236/12.12 |
| 4,780,917 | 11/1988 | Hancock | 4/544 |
| 5,095,398 | 3/1992 | Winter et al. | 361/42 |
| 5,361,215 | 11/1994 | Tompkins | 364/505 |
| 5,504,306 | 4/1996 | Russell et al. | 219/497 |
| 5,550,753 | 8/1996 | Tompkins et al. | 700/300 |
| 5,585,025 | 12/1996 | Idland | 219/497 |
| 5,673,360 | 9/1997 | Scripps | 392/405 |
| 5,708,548 | 1/1998 | Greeve et al. | 361/42 |
| 5,995,348 | 11/1999 | McCartan et al. | 361/42 |

FOREIGN PATENT DOCUMENTS

| | | |
|---|---|---|
| 0009249 A1 | 4/1980 | (EP) . |
| 0677909 A | 10/1995 | (EP) . |
| 2444359 A | 7/1980 | (FR) . |
| 60-14677 | 1/1985 | (JP) . |
| WO 9613963 A | 5/1996 | (WO) . |

OTHER PUBLICATIONS

Hydrotouch II, Digital Command Center by BakerHydro, Inc., a division of TOLO, Incorporated in 1981.

Spa–Troller, The Computerized System by the Spa–Trol Company, (No Date).

Spa–Troller Newsletter, Issue No. 1; Oct. 12, 1981 (2 pages).

Spa–Troller Newsletter, Issue No. 3; Dec. 18, 1981 (2 pages).

Spa–Troller Newsletter, Issue No. 4; Mar. 1982 (2 pages).

Spa–Troller Newsletter, Issue No. 5; Jun. 1, 1982 (2 pages).

Spa–Troller Newsletter, Issue No. 5; Sep. 1982 (1 page).

Photographs (2 pages).

Agreement Between ICS Development, Inc. and Siege Industries, Inc.; Mar. 27, 1987 (45 pages).

Graphic of a Spa–Trol (1 page).

Spa–Tec OEM Packet; 1987 (23 pages).

Spa–Tec Users' Guide; 1987 (8 pages).

Sentry 700 Series—701 and 724 Installation and Owners Manual, Copyrighted 1988 and Revised Jun. 1990.

Balboa 700 Series Schematic Dated Oct. 19, 1988 and Revised on Dec. 8, 1988.

A Description Prepared by a Paid Expert of Assignee (Dr. John Bennett of Rice University) of a Spa–Trol Unit (No Date).

Deposition Testimony of a Mr. Sadati, an Engineer at Sundance Spas Who Has Performed Some Analysis on the Spa–Trol Model (No Date).

Additional BakerHydro Brochures (No Date).

Deposition of Glenn Gouldey, vol. 1, Mar. 11, 1996 (pp. 1–75).

Eaton Spa Monitor II Descriptions Dated Jan. 13, 1983 and May 24, 1983 (2 pages).

Block Diagram Spa Monitor (No Date) (1 page).

Sales Call Report Dated Jul. 20, 1987, Aug. 26, 1983 (3 pages).

One Page Electrical Schematic Diagram entitled "Sch.Duplex System Controller," Balboa Instruments, Inc., drawn date Aug. 27, 1992; with Two Page Description of the schematic diagram entitled "Hardware High Limit."

CONTROL SYSTEM FOR BATHERS

CROSS-REFERENCE TO RELATED APPLICATIONS

This application claims the benefit of U.S. Provisional Application No. 60/099,201, filed Sep. 3, 1998, the entire contents of which are incorporated herein by this reference.

This application is related to co-pending application Ser. No. 09/335,308, filed concurrently herewith, CONTROL SYSTEM FOR BATHERS WITH GROUND CONTINUITY AND GROUND FAULT DETECTION, by David J. Cline et al., the entire contents of which are incorporated herein by this reference.

TECHNICAL FIELD OF THE INVENTION

This invention relates to control systems for bathing systems such as portable spas.

BACKGROUND OF THE INVENTION

A bathing system such as a spa typically includes a vessel for holding water, pumps, a blower, a light, a heater and a control for managing these features. The control usually includes a control panel and a series of switches which connect to the various components with electrical wire. Sensors then detect water temperature and water flow parameters, and feed this information into a microprocessor which operates the pumps and heater in accordance with programming. U.S. Pat. Nos. 5,361,215, 5,559,720 and 5,550,753 show various methods of implementing a microprocessor based spa control system.

For a properly designed system, the safety of the user and the equipment is important, and is typically concerned with the elimination of shock hazard through effective insulation and isolated circuity, which prevents normal supply voltage from reaching the user. Examples of isolation systems for spa side electronic control panels are described in U.S. Pat. Nos. 4,618,797 and 5,332,944.

The design of a system to control spas is complicated by the fact that there are electrical components in direct contact with the spa water. These electrical components, such as the heater, pumps, lights and blower are required to operate with precision and safety. If a malfunction occurs, it should be detected immediately and the spa shut down to protect the safety of the bather.

The accuracy of the temperature of the spa water is also important to the safety and comfort of the spa users. This temperature can vary depending on the number of bathers, the amount of insulation which is used in the construction of the spa, the operation of the pumps and blowers, and the outside temperature surrounding the spa.

When in continuous use, the spa temperature is controlled by temperature sensors which measure the temperature of the water, and selectively activate a pump to circulate water, and a heater which raises the water to the temperature set by the user at the control panel. There has not in the past been an effective method of accurately measuring and displaying the temperature of the spa if at least one of the various temperature sensors are not located at the spa, in direct contact with the water in the bathing vessel. The consequence of this is that the assembly of the control system into the spa is complicated and expensive, and requires special attention to the location, insulation and protection of the temperature sensors to achieve satisfactory results.

In normal service, a spa is kept continuously energized, and energy utilization is high during this time. However, bathers are typically in the spa water less than 5% of the daily time the spa is in place. At times when the spa is not in continuous use, the user may want to maintain a temperature close to use temperature, i.e. in an "almost ready" condition, so the spa may be quickly prepared for use by the bather. During this "almost ready" time, and while the owner is away from the spa site, e.g. on vacation, there is a need to maintain the water sanitation quality, and the temperature may be maintained at a lower level to conserve heat energy and therefore electrical energy. It would be advantageous if the spa computer system could record and predict the habits of the bather, and provide an optimum temperature maintenance based on the frequency of high and low usage. It would further be advantageous for the computer system to be able to predict the rate at which heat is lost and manage the pump and heater operations for optimum energy conservation, also reducing mechanical wear and tear on these components. These features are unknown and unavailable in known spa systems.

Because of the potentially corrosive nature of the spa water, and the possibility of the loss of the pump function due to pump failure, the system should have redundant systems to prevent damage to the heating element in the case of pump failure or water flow blockage. The use of mechanical devices such as pressure switches which respond to the pressure developed by pump outlet when the pump is activated, are prone to mechanical failure, corrosion failure and leaks. Flow switches which respond to the flow of water through a pipe or tube tend to be expensive, and subject to failure due to hair and foreign materials wrapping around the activating system, requiring frequent service. Pressure switches, currently the most popular method of water flow detection, can give false readings, are subject to damage and deterioration and often require calibration.

An additional hazard represented by the close proximity of electrical energy to the bathers, is a significant safety hazard to the user if the spa is not properly constructed and installed. The integrity of the ground earth system, which protects the spa user in case of an electrical failure of the heater element insulation system is important. Additionally, the control system preferably has an ability to detect and respond to a failure of the insulation system, and actively protect the user by disconnecting the device which has failed.

As systems controlled by microprocessors or other electronic controls can break down, be damaged by voltage surges, or fail through various component malfunctions, it would be highly desirable to have a redundant mechanism to protect from an overtemperature condition and shut down the system completely. This hardware high limit preferably would have the characteristic of tripping only once, and remaining in the off position, even after power down and repowering, but be resettable conveniently by the user without exposure to the high voltage wiring of the spa electrical system.

The control method of some conventional systems is subject to short cycling or rapid on-off pump activations because the location of the temperature sensors can cool off more quickly than the spa water.

Typical known spa control systems have employed a mechanical pressure switch or a mechanical flow switch which are subject to calibration failure, or mechanical breakdown. These random failures are difficult to repair, and present a considerable inconvenience to the user, since a spa is too large to move and must be repaired by a spa service technician.

Known spa control systems do not teach or use a method or technique of protecting the user from electric shock when the insulation of the electrical heater element is damaged and breached and the live electrical current is exposed to the bather's water and the ground line is absent.

A ground fault circuit interrupter (GFCI) is employed in typical spa systems which is remotely mounted in the power supply line to the spa. This GFCI must be tested by the user before each use to insure that it is functional, presenting an inconvenience.

SUMMARY OF THE INVENTION

In accordance with an aspect of this invention, techniques of improving the reliability and safety of the spa or hot tub are described, whereby the user is protected from the possible overheating of a spa through the use of a multiple sensor array which automatically responds to the failure of a component and covers the shutdown of the spa heating system before equipment is damaged or personnel are injured. Additionally, a more effective way of managing the set temperature of the spa is described, and a far more versatile and reliable method of heater overtemperature mode is provided.

A further aspect of this invention is a bather's control system which uses a plurality of temperature sensors to provide temperature measurement and other data to a microprocessor, each sensor additionally feeding temperature information to an individual manually resettable hardware high limit circuit, which operates separately from the computer temperature control system. The temperature sensors are proximately located with respect to the heater, and a computer algorithm prevents short cycling and provides highly accurate spa temperature control.

A further aspect of this invention is a control system associated with a heater, where water flow through the heater can be from either direction on the outlet side or pressure side of the pump, or from either direction on the inlet or suction side of the pump.

Another aspect of the invention is a method of collecting and displaying and acting on temperature data, which improves user safety and equipment reliability.

A further aspect is a solid state electrical conductive circuit which detects the presence of water in the heater through electrical solid state probes in the water, and/or through the use of multiple temperature readings separated by a time interval, thereby eliminating the need for mechanical sensors that might fail.

Another aspect is a technique of preventing short cycling of a spa control when all temperature sensing is accomplished at the heater of the spa. This is accomplished in an exemplary embodiment through a control routine which moves water to the temperature sensor, at which time the computer can properly sense the spa water temperature.

A further aspect is the intelligent selection of which temperature sensor to use to control the temperature of the spa.

A further aspect is a technique for permitting a second pump, not associated with the heater circulation pump, to be monitored by the high limit circuits in the spa.

A further aspect is a technique of managing the energy usage of the spa by automatically shifting into a lower temperature maintenance state at a specified time interval after the last use of the spa by a bather.

Thus, in accordance with one aspect of the invention, a heating and control system for bathers is described, which includes an electronic controller. An electric heater assembly is connected in a water flow path for heating water passing therethrough, comprising a heater housing and electric heater element, the controller arranged to control the operation of the heater element. A water temperature sensor apparatus provides electrical temperature signals to the controller indicative of water temperature at separated first and second locations on or within the heater housing or a combination thereof. The system further includes water presence sensor apparatus to determine the presence or absence of water within the heater housing.

In accordance with another aspect, a heating and control system for bathers for heating water is described, which includes a control circuit board assembly comprising at least one power relay. A high voltage power supply is connected to the control circuit board assembly. A control panel is provided for inputting user preferences. A heater assembly includes a heater housing element connected to the control circuit board assembly. A first water pump is connected to the control circuit board assembly. A microprocessor is coupled to the control panel and to the control circuit board assembly, said microprocessor adapted to process signals from a plurality of devices providing water parameter information and to energize the heater according to user preferences. The devices include water presence sensor apparatus for detecting the presence of water in the heater housing element, and a water temperature sensor apparatus for providing electrical temperature signals to the controller indicative of water temperature at separated first and second locations on or within the heater housing or a combination thereof. An independent circuit apparatus is connected to the water temperature sensor apparatus and to the at least one power relay, for automatically causing the high voltage power to be disconnected from the heater assembly when the water temperature exceeds a predetermined temperature. The independent circuit apparatus requires a manual reset once the water temperature has dropped below a predetermined level to allow the high voltage power to be reconnected to the heater assembly.

In accordance with another aspect of the invention, a spa is described which includes a heating and control system for bathers. The system includes a control circuit board assembly including a microprocessor, a high voltage power supply connected to the control circuit board assembly, a heater assembly connected to the control circuit board assembly, water presence sensor apparatus to determine the presence of water within the heater assembly, a pump for circulating water through the heater assembly, at least one temperature sensor for generating an electrical signal proportional to water temperature located at the heater, and an electronic controller adapted to selectively activate and deactivate said pump at selected time intervals.

A method is described for detecting the presence of water in a system including a heater element, a heater housing, and a microcomputer, the microcomputer controlling the heater, at least one temperature sensor in close proximity to the heater element, the temperature sensor feeding temperature data to the microcomputer, the method comprising:

collecting and storing a first temperature measurement value;

activating the heater element for a predetermined time interval;

deactivating the heater element for a selected time interval;

collecting and storing a second temperature measurement value;

calculating the difference between the first temperature measurement value and the second temperature measurement value;

comparing the resulting difference to a predetermined value to establish the presence or absence of water adjacent the heater element.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

Figure 1:
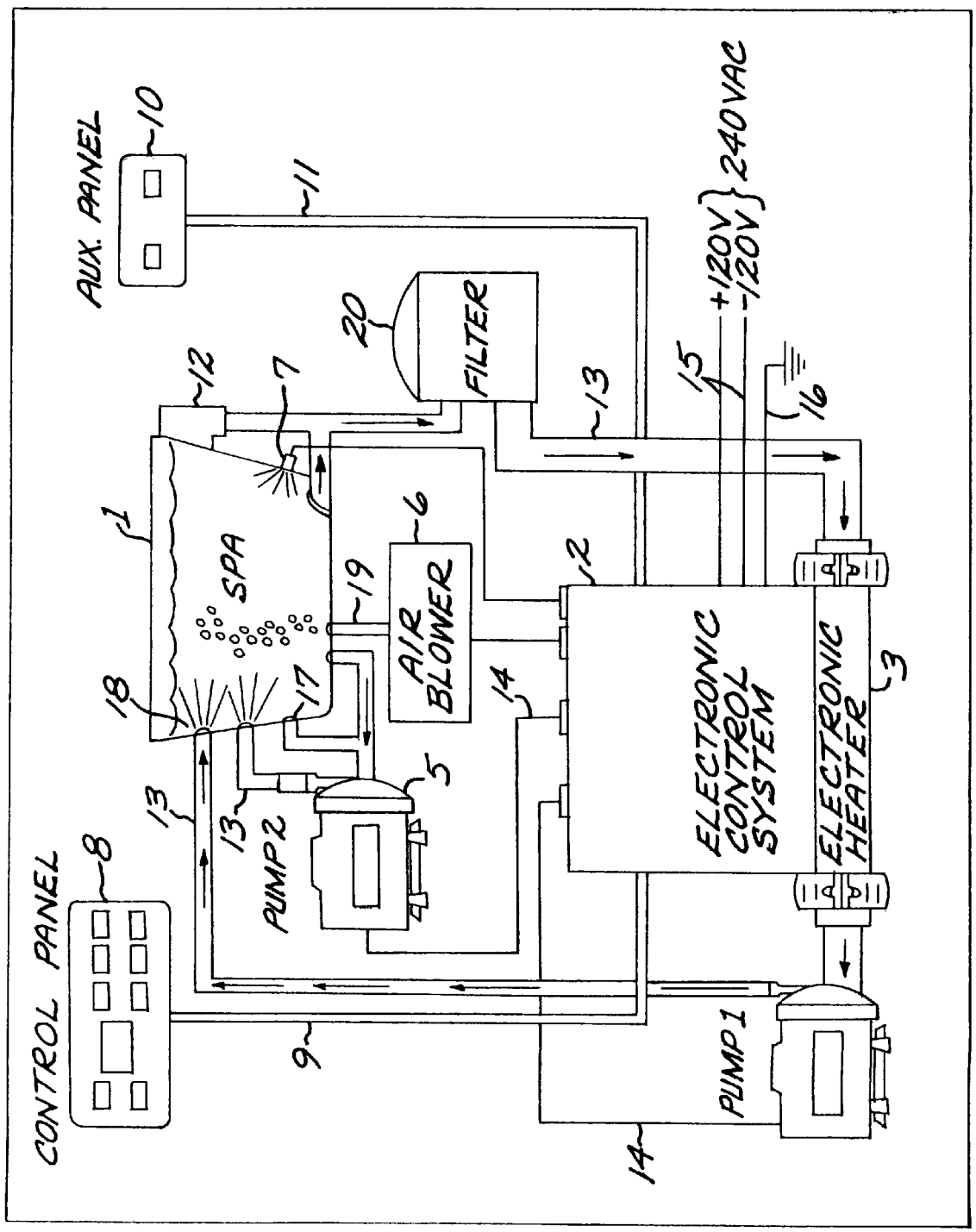
FIG. 1 is a schematic diagram of a system for bathers including a vessel for holding bathing water, a control system, and associated water management equipment.

FIG. 1 illustrates an overall block diagram of a spa system with typical equipment and plumbing installed. The system includes a spa 1 for bathers with water, and a control system 2 to activate and manage the various parameters of the spa. Connected to the spa 1 through a series of plumbing lines 13 are pumps 4 and 5 for pumping water, a skimmer 12 for cleaning the surface of the spa, a filter 20 for removing particulate impurities in the water, an air blower 6 for delivering therapy bubbles to the spa through air pipe 19, and an electric heater 3 for maintaining the temperature of the spa at a temperature set by the user. The heater 3 in this embodiment is an electric heater, but a gas heater can be used for this purpose also. Generally, a light 7 is provided for internal illumination of the water.

Service voltage power is supplied to the spa control system at electrical service wiring 15, which can be 120V or 240V single phase 60 cycle, 220V single phase 50 cycle, or any other generally accepted power service suitable for commercial or residential service. An earth ground 16 is connected to the control system and there through to all electrical components which carry service voltage power and all metal parts. Electrically connected to the control system through respective cables 9 and 11 are the control panels 8 and 10. All components powered by the control system are connected by cables 14 suitable for carrying appropriate levels of voltage and current to properly operate the spa.

Water is drawn to the plumbing system generally through the skimmer 12 or suction fittings 17, and discharged back into the spa through therapy jets 18.

Figure 2A:
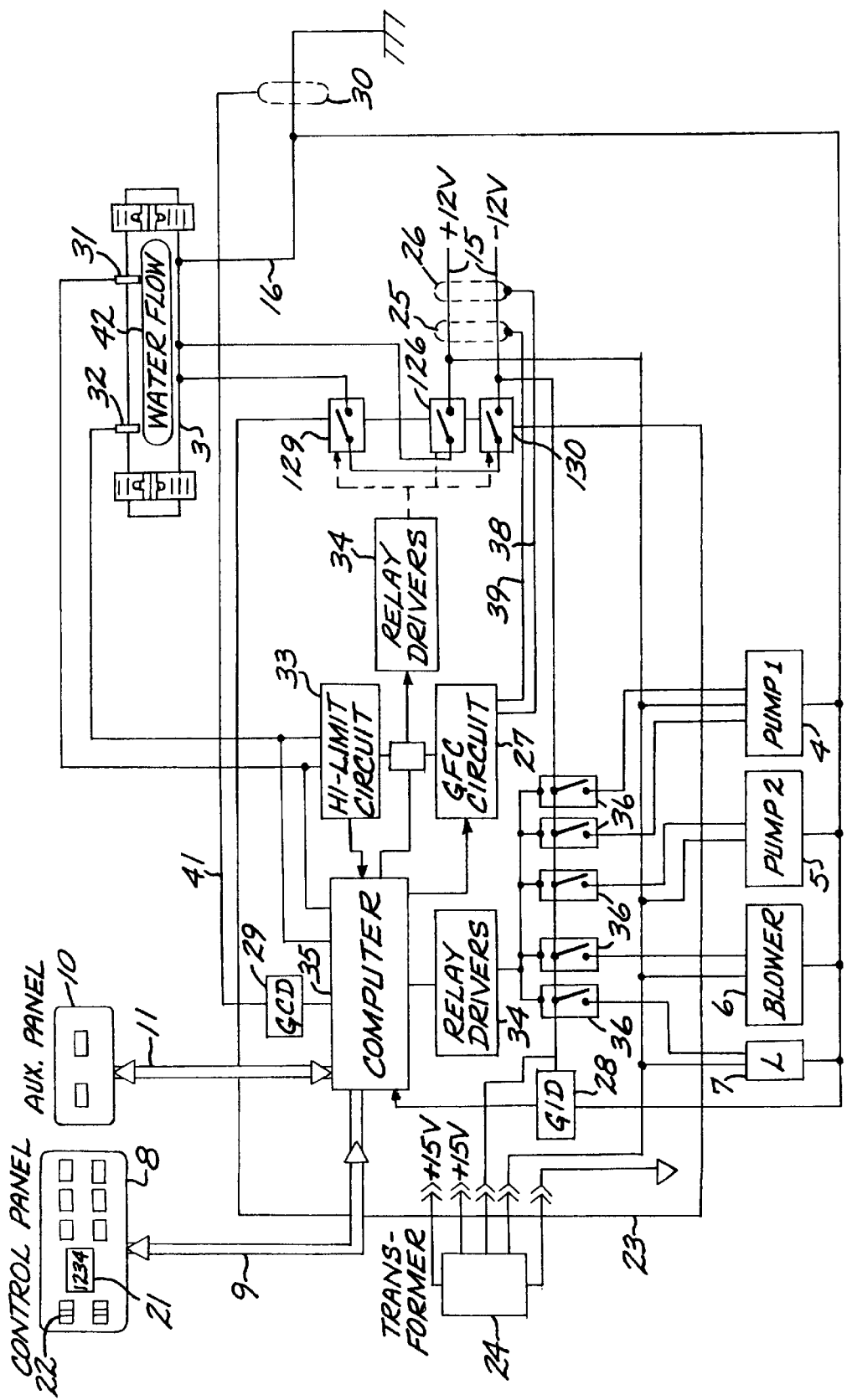
FIG. 2A is a schematic block diagram of an embodiment of a control for a bathing system with various safety and water management features.
Figure 2B:
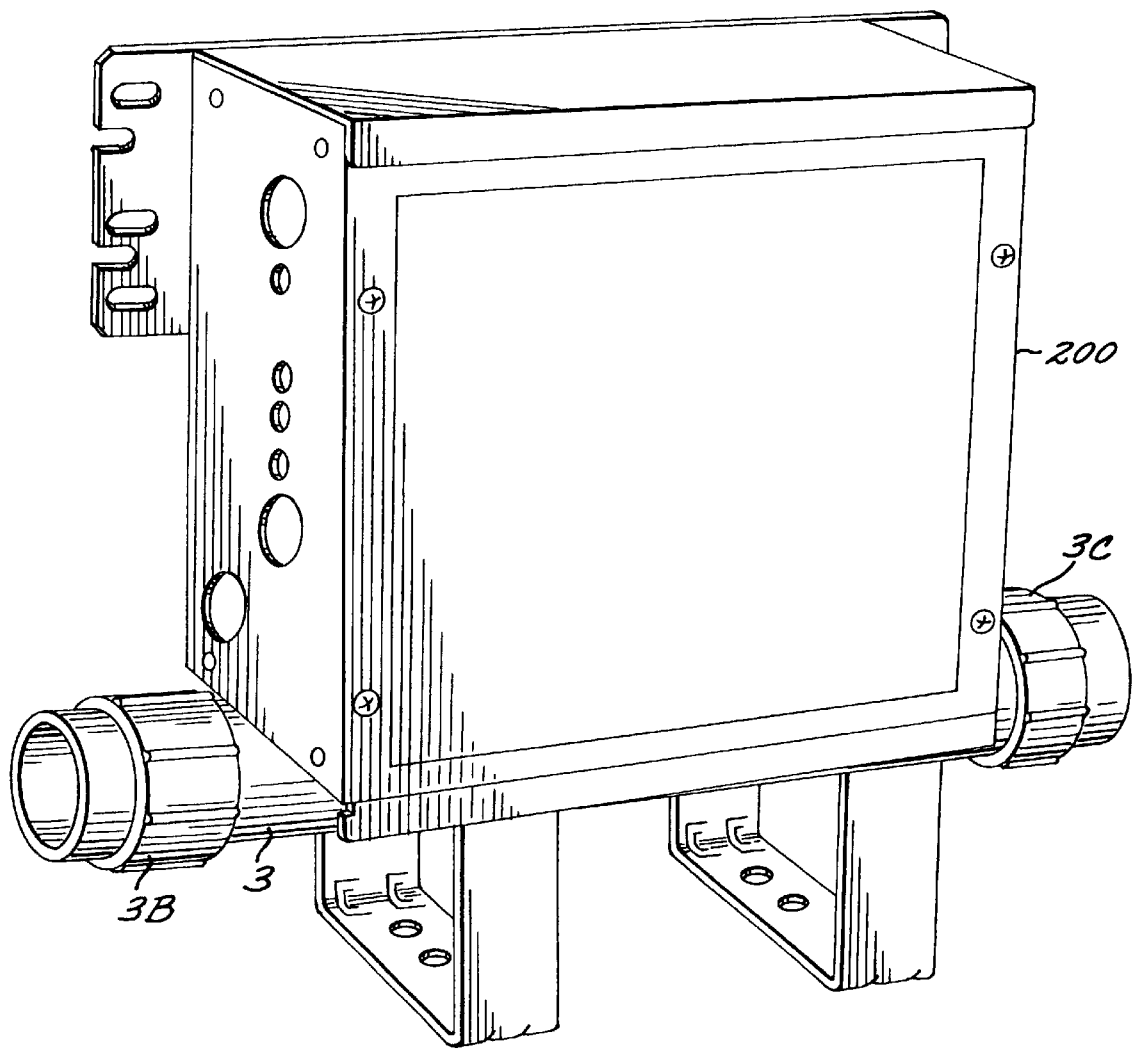
FIG. 2B is an isometric view of an exemplary embodiment of the control circuit board assembly enclosure and attached heater assembly.

An exemplary embodiment of the electronic control system is illustrated in schematic form in FIG. 2A. The control system circuit assembly board is housed in a protective metallic enclosure 200, as illustrated in FIG. 2B. The heater assembly 3 is attached to the enclosure 200, and includes inlet/outlet ports 3A, 3B with couplings for connection to the spa water pipe system.

As shown in FIG. 2A, the electronic control system 2 includes a variety of electrical components generally disposed on a circuit board 23 and connected to the service voltage power connection 15. Earth ground 16 is brought within the enclosure 200 of the electronic control system and is attached to a common collection point.

Adjacent to the circuit board 23 and connected via an electrical plug, a power and isolation transformer 24 is provided. This transformer converts the service line power from high voltage with respect to earth ground to low voltage, fully isolated from the service line power by a variety of methods well known in the art.

Figure 14:
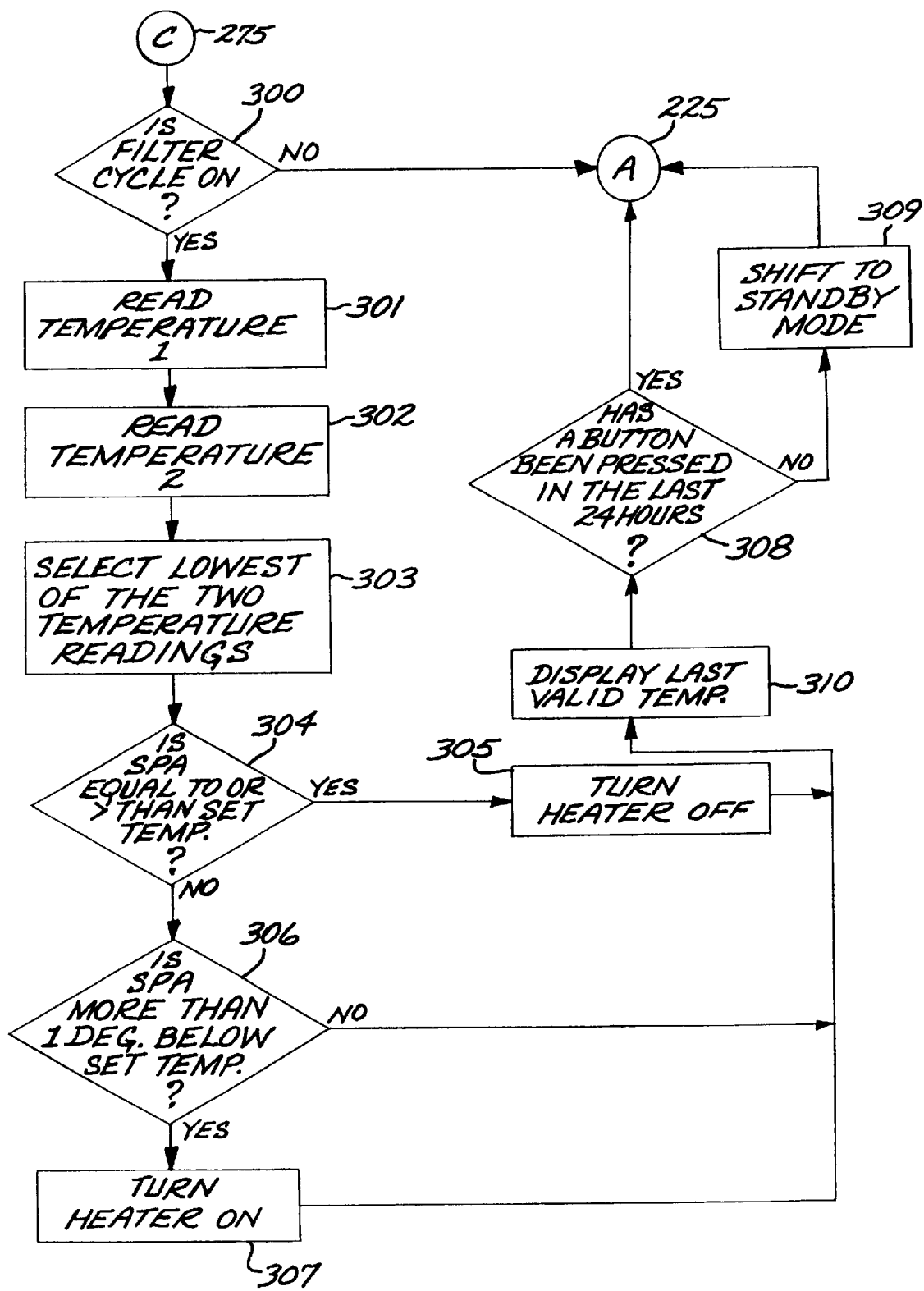
FIG. 14 is a flow diagram of an economy mode of operation of a program for temperature management.
Figure 15:
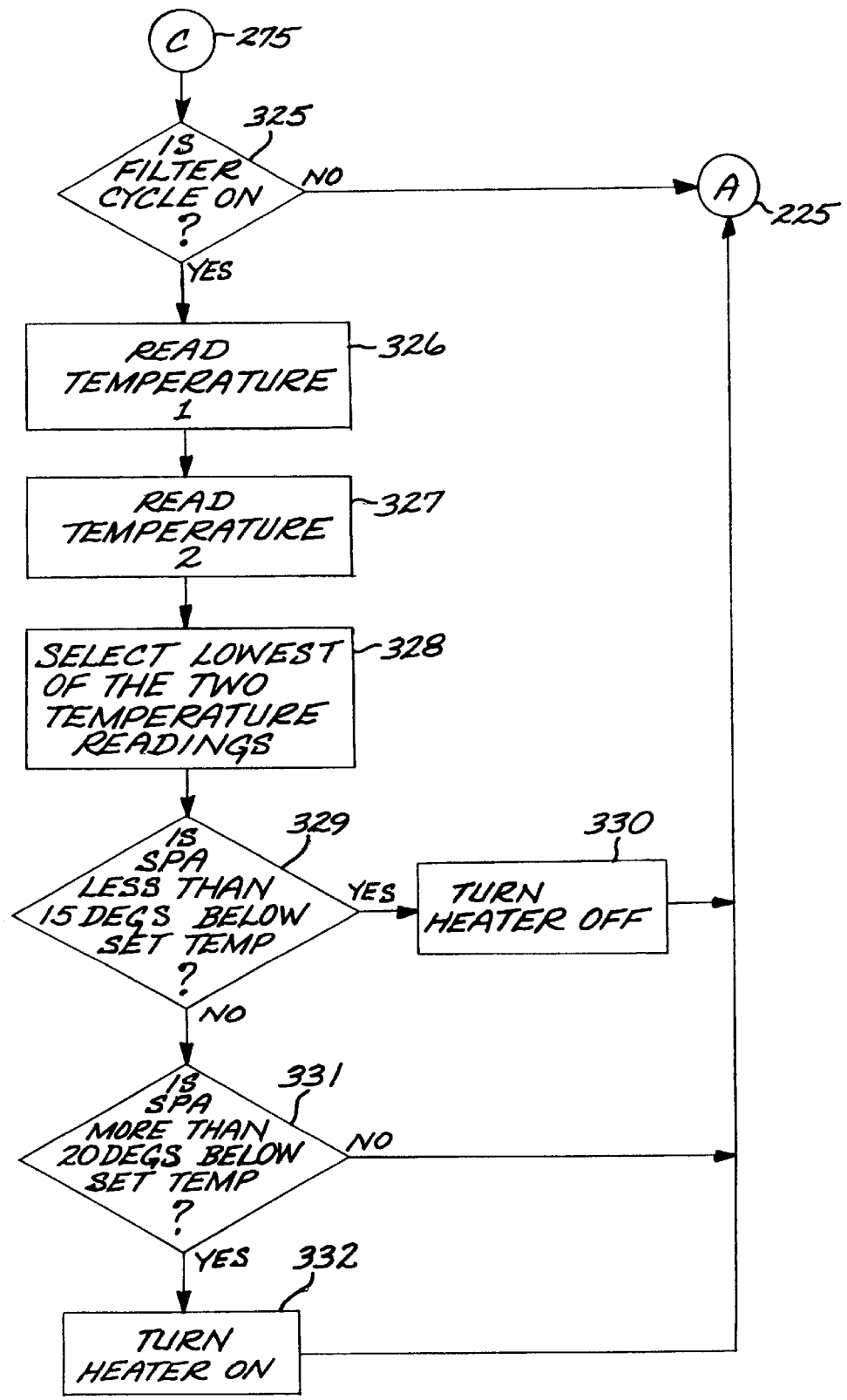
FIG. 15 is a flow diagram of a standby mode of operation of a program for temperature management.

Also provided on the circuit board 23, in this exemplary embodiment, is a control system computer 35, e.g. a microcomputer such as a Pic 16C65A CMOS microcomputer marketed by Microchip, which accepts information from a variety of sensors and acts on the information, thereby operating according to instructions described more fully in FIG. 14. The invention is not limited to the use of a controller including a microcomputer or microprocessor, whose functions can instead be performed by other circuitry, including, by way of example only, an ASIC, or by discrete logic circuitry.

One output of the computer 35 is displayed on the control panel 8 through a character display system rendered optically visible by technology generally known in the art. Tactile sensors 22 are provided to convert user instructions to computer readable format which is returned to the control system computer 35 via cable 9.

The equipment necessary to heat and manage the water quality, i.e. the heater system 3, pumps 5 and 6, blower 4 and light 7, are connected via electrical cables 14 to relays 36, 126, 129 and 130 on the circuit board 23, which function under the control of relay drivers 34, selectively driven by the microcomputer 35. These relays and relay drivers function as electrically controlled switches to operate the powered devices, and are accomplished by methods well known in the art and provide electrical isolation from the service voltage power for the low voltage control circuitry. Of course, other types of switching devices can alternatively be employed, such as SCRs and triacs.

Figure 3:
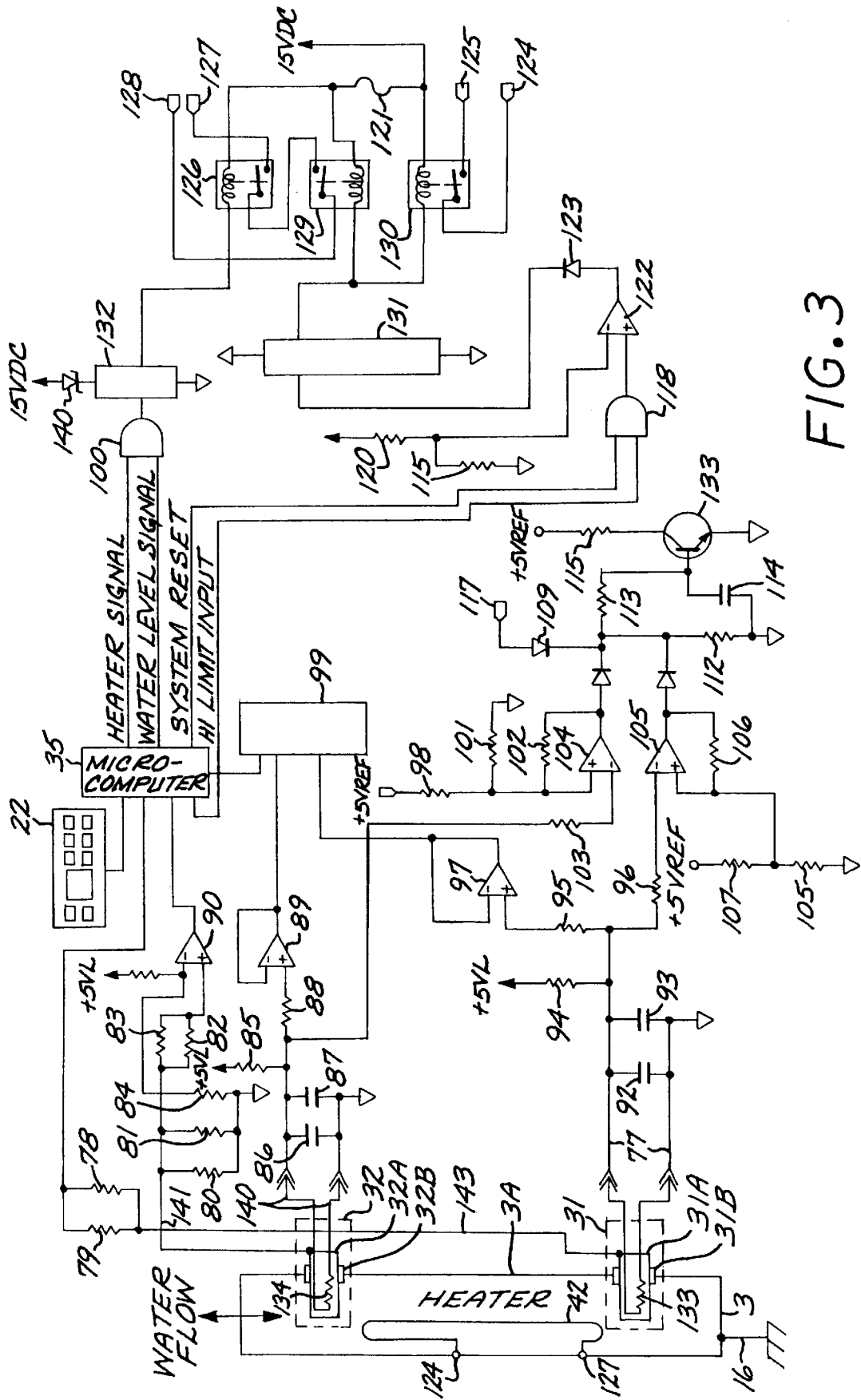
FIG. 3 is an electrical schematic diagram showing one embodiment of a water detection safety and water management electrical circuits associated with a system for bathers.

Referring now to FIG. 3, also arrayed upon the circuit board and integral thereto in this exemplary embodiment are several safety circuits, which protect the system in case of error or failure of the components. Shown in the functional schematic diagram of FIG. 3 is the heater system 3, which includes a generally tubular metal housing 3A constructed of a corrosion resistant material such as 316 stainless steel, a heater element 42 for heating the water, a heater power connection 37 from heater relays to the terminal of the heater element, and sensors 31 and 32 connected through lines 40 to appropriate circuity on the circuit board. These sensors are connected on the circuit board to both a hardware high limit circuit 33 (FIG. 2A) and to the computer control circuit 35.

A torroid 30, constructed in accordance with techniques well known in the art, is provided through which the earth ground connection 16 from the heater housing and any other ground connection in the system passes. This torroid is electrically connected by cable 41 to the ground current detector circuitry 29 which is more fully described in FIG. 6. The output of the ground current detector (GCD) is provided to the computer system 35 via an electrical connection through the signal conditioning circuitry.

Figure 11:
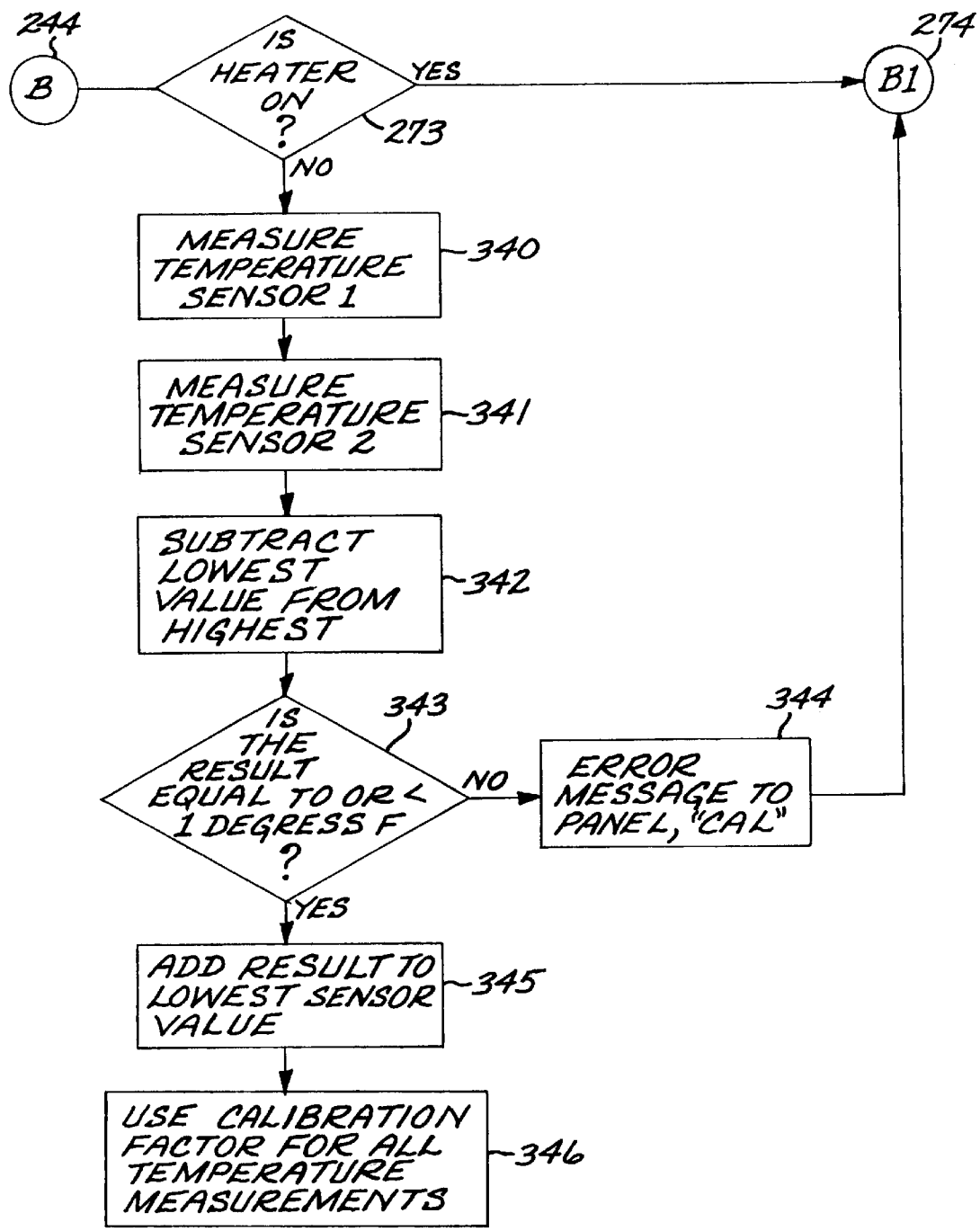
FIG. 11 is a flow diagram illustrating a technique for self calibration of temperature sensors and display of error message.
Figure 12A:
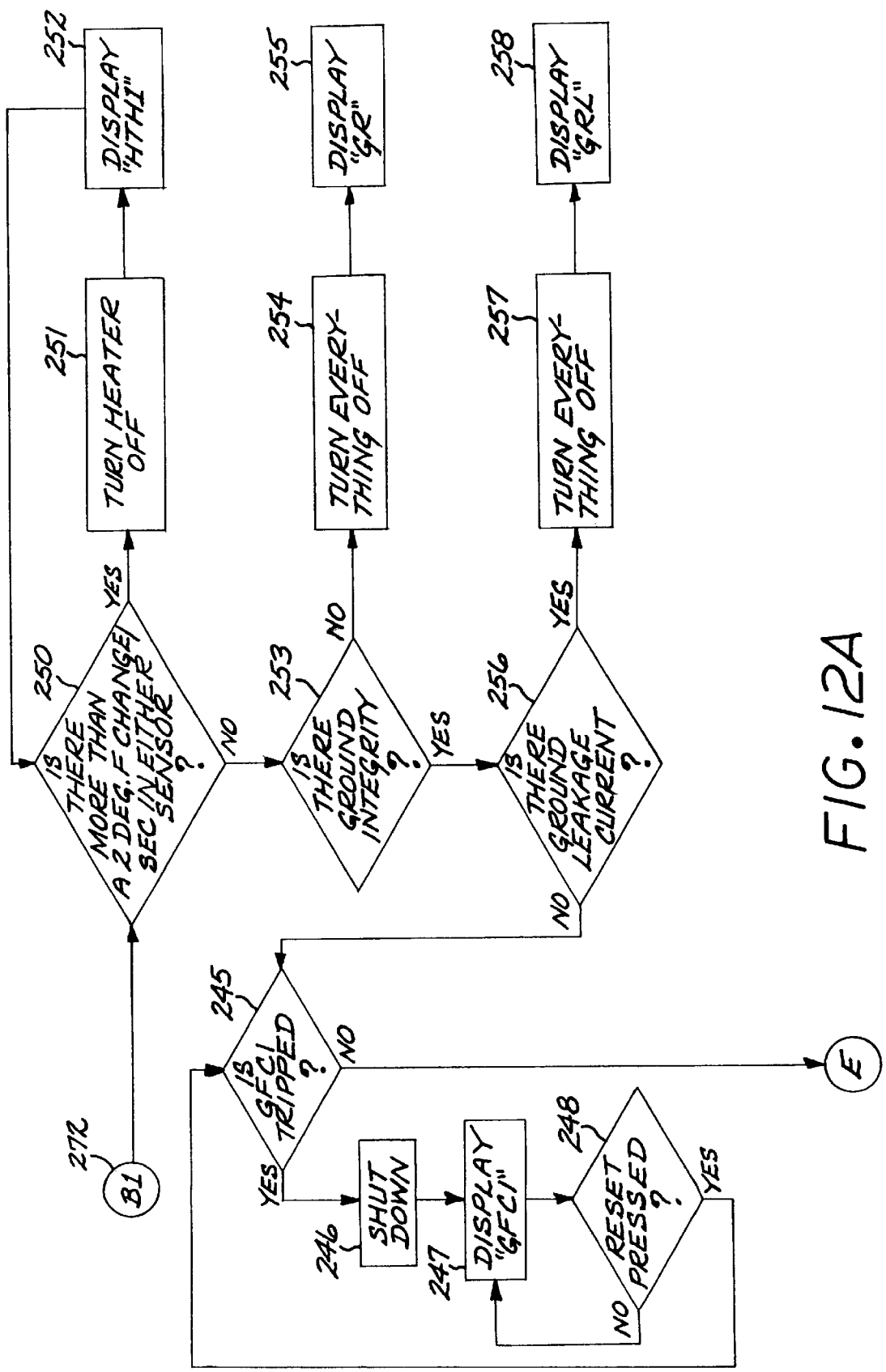
FIG. 12 is a flow diagram illustrative of a program to monitor a safety circuit, temperature rate of rise, GFCI and temperature sensor short/open detection.
Figure 12B:
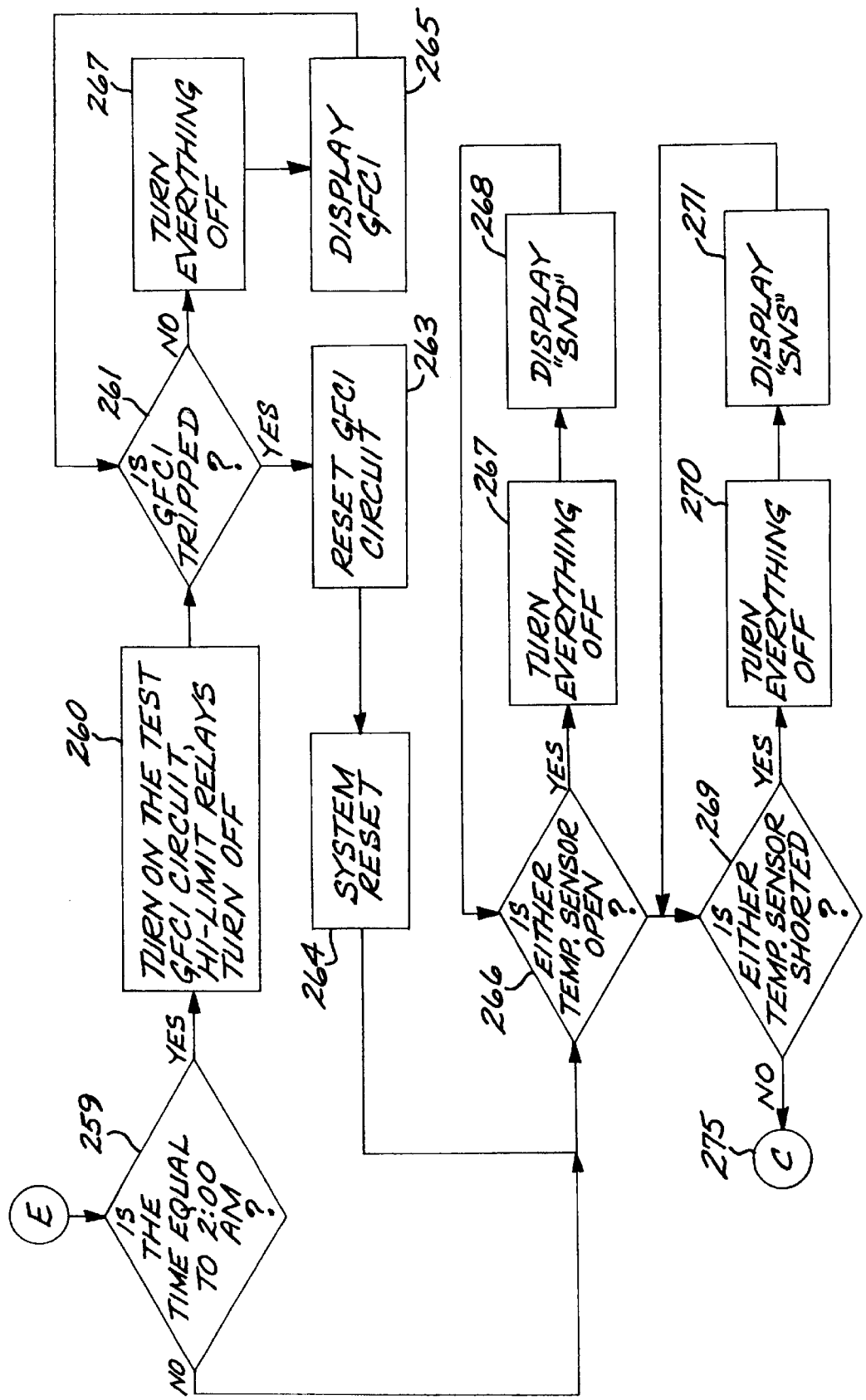
Figure 13A:
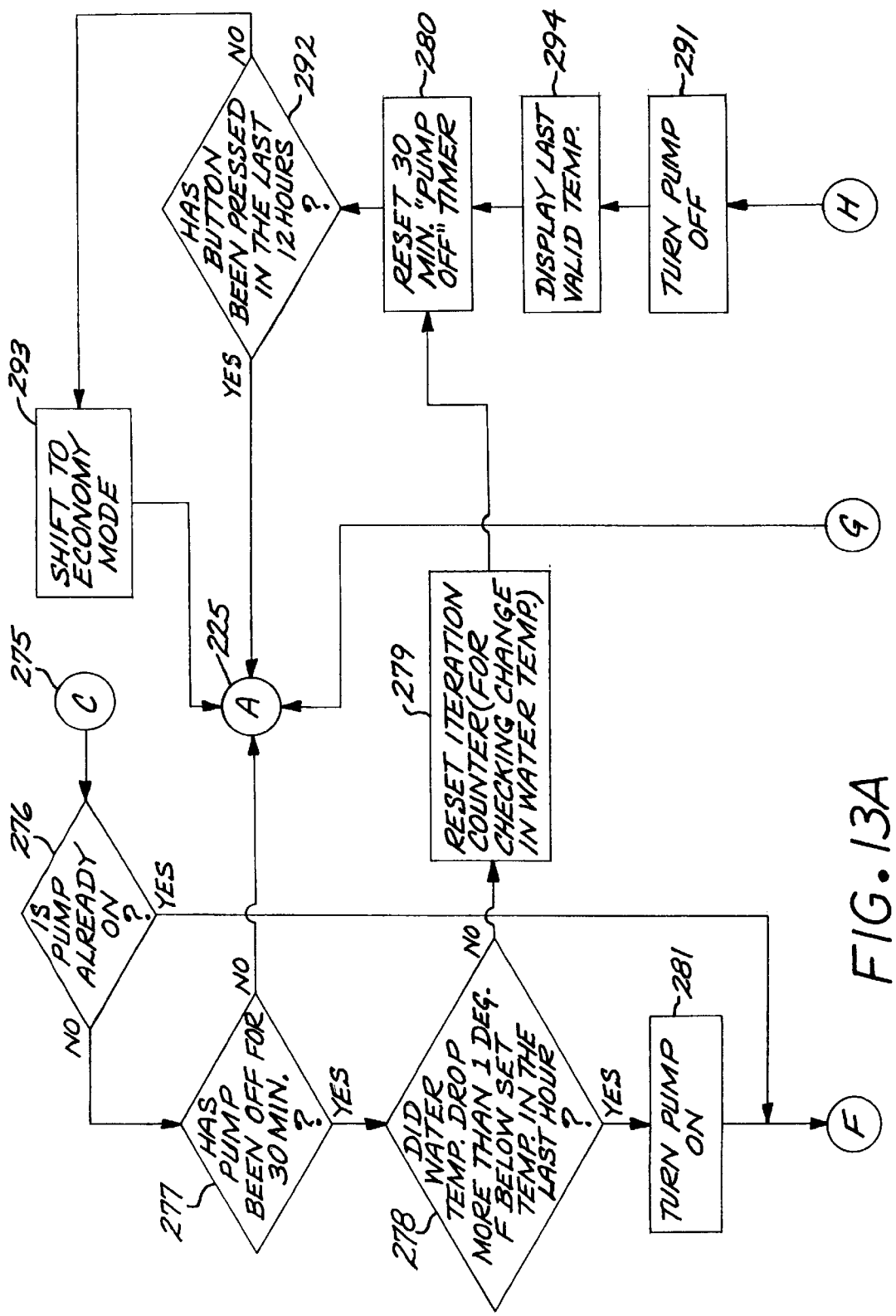
FIG. 13 is a flow diagram of a standard mode of operation of a program for intelligent, temperature maintenance using rate of heat loss to drive sampling frequency schedule.
Figure 13B:
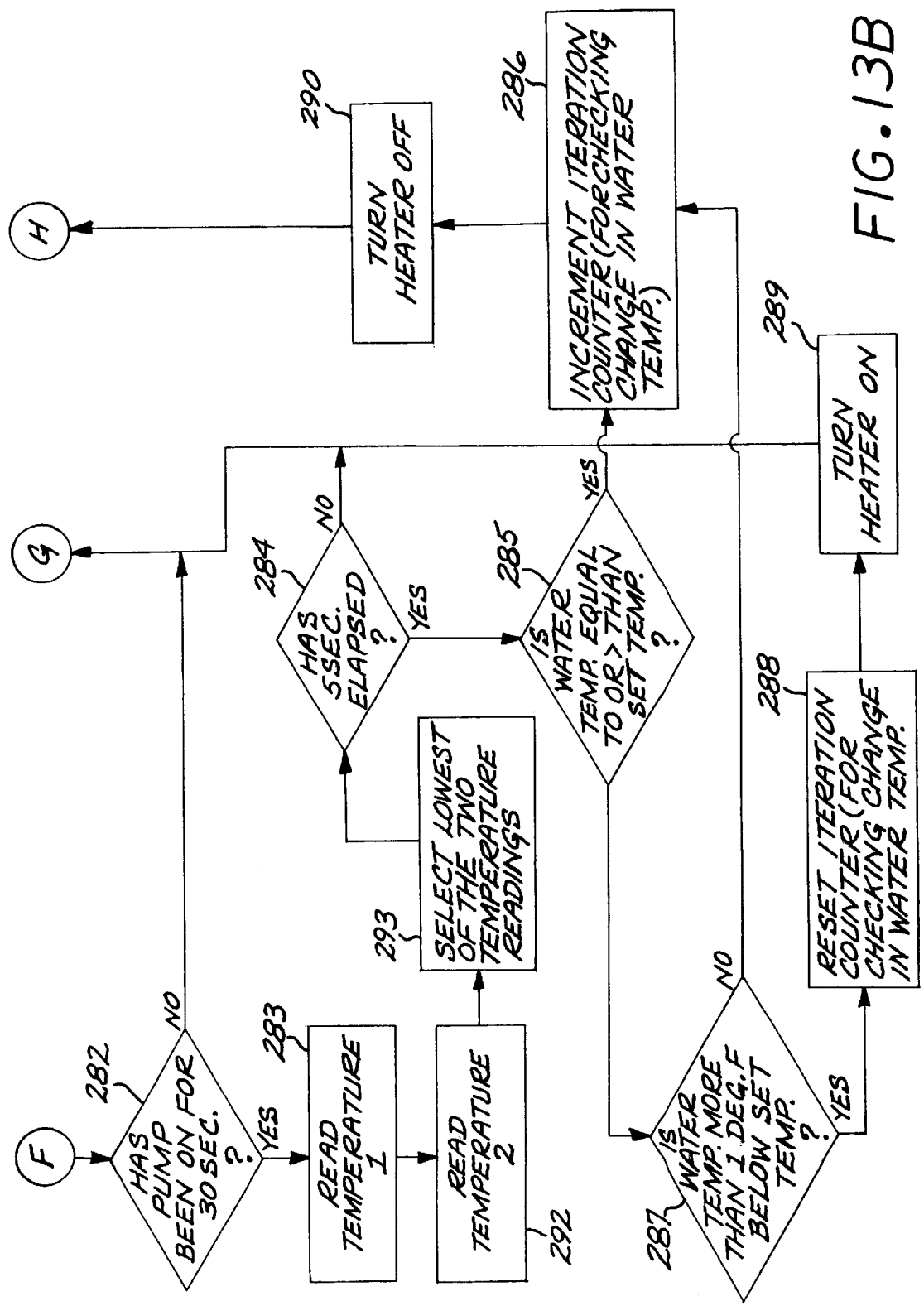

The service voltage power is provided to the system through the center of a pair of conventional torroids 25 and 26. The electrical outputs of these torroids are connected to a ground fault circuit interrupter circuit 27 by electrical connections shown as 38 and 39. The ground fault circuit interrupter is described more fully in FIG. 4. The ground fault circuit interrupter feeds a signal to the computer 35, which tells the computer of a ground fault existence. Testing of the ground fault circuit interrupter is managed by the computer on a regular basis, and an exemplary program algorithm of this activity is illustrated in FIG. 11.

Figure 5:
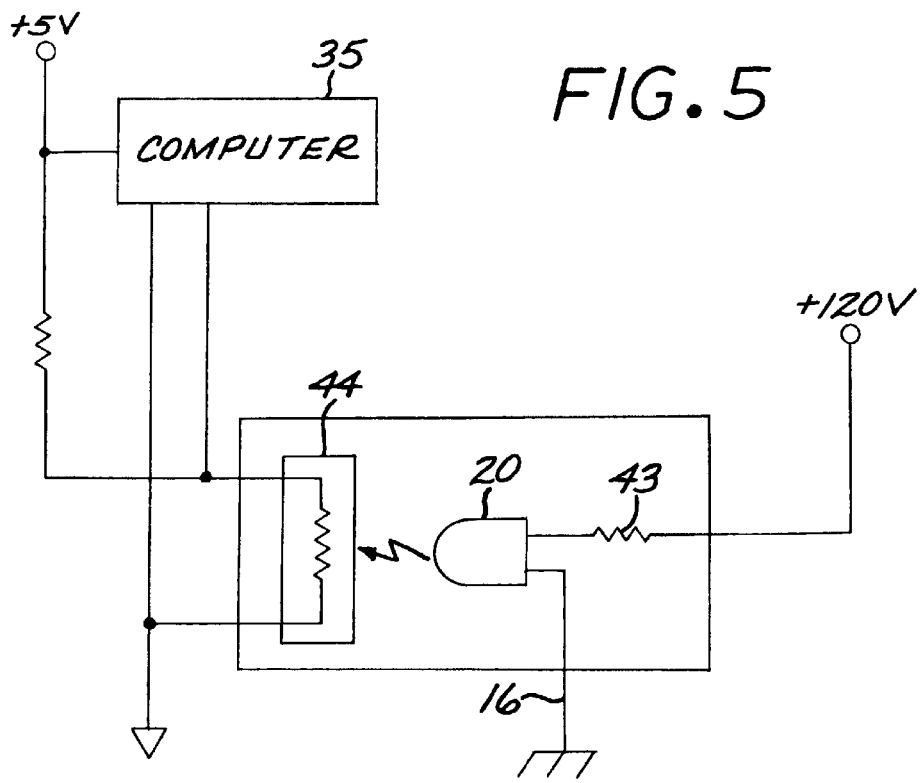
FIG. 5 shows a Ground Integrity Detector circuit to detect and identify a disconnected ground.

A ground integrity detector 28 is provided which is more fully described in FIG. 5. The ground integrity detector is attached to the earth ground 16 and provides a signal to the computer control 35. If more than one earth ground is used in a particular application, another ground integrity detector could be used in accordance with the invention to verify the ground continuity.

FIG. 3 is a schematic diagram of a temperature sensing system for a spa, and comprises the control system. Heater assembly 3 has a heater shell 3A, most usually made of metal, but can also be constructed of conductive plastic or of plastic with an internal metallic ground plate. Confined within the heater shell is a heater element 43, constructed to provide insulation from the water as generally known in the art. Power is provided to the heater element from connection points 124 and 127. This power is provided responsively to the programmed temperature provided to the microcomputer 35 through control panel 22 as is generally known from the prior art.

In this exemplary embodiment, the heater housing 50 is tubular in shape. However, other shapes come within the scope of this invention provided they have an inlet and an outlet. Located close to each end of the heater element are temperature sensor assemblies. These assemblies include thermistors 133 and 134, which are usually of a negative temperature coefficient (d). However, they can be positive temperature coefficient thermistors, thermocouples or any other temperature sensitive means. The temperature sensor is generally potted in epoxy or the like, in stainless steel housings 31 and 32. The stainless steel housings are mounted into the side of the heater assembly with insulating collars, which provides a water pressure seal and an insulative barrier from the heater housing. However, when water is present, there is a conductive path which can be detected by the associated circuitry. This conductive path extends from sensor housing 32 to sensor housing 31 through the water in the housing. When microcomputer 35 sets the output high through resistor pair 78, 79, current travels through connecting wires 141, 143 and the sensor housings 31A, 32A, water between the sensor housings, and voltage divider network created by resistor pair 80, 81, resistor 84, resistor pair 82, 83 and resistor 91. The resulting voltage is buffered to the microcomputer by op amp 90, which is powered and installed according to known techniques.

Figure 7A:
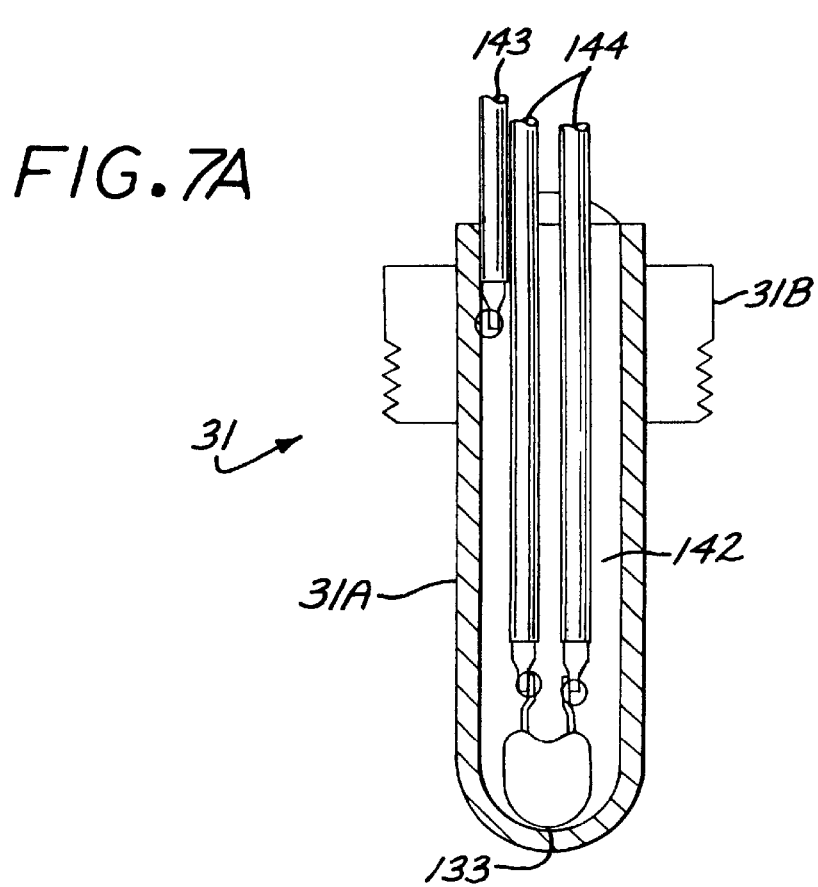
FIG. 7A is a cross-sectional diagram of a temperature sensor assembly showing the conductive casing and the components therein.

FIG. 7A illustrates in cross-section an exemplary one of the temperature sensor assemblies 31, 33. The assembly 31 includes a stainless steel or other corrosion-resistant housing 31A, which is mounted into the heater housing using an insulative bushing 31B. The bushing is fabricated of a dielectric material, for example, KYNAR™ or polyprophylene, thus electrically insulating the housing 31A from the heater housing. The bushing 31B can have a threaded peripheral surface (as shown) which is threaded into a correspondingly threaded opening in the heater housing. Alternatively or in addition, the bushing can be sealed into the opening with a non-conductive adhesive. The thermistor 133 is mounted at a distal end of the housing 31A, to be positioned within the heater housing in close proximity to the water flow through the heater housing. Wires 144 provide an electrical connection to the thermistor from the circuit 2. A third wire 143 is passed into the housing 31A from circuit 2, and is electrically connected to the housing 31A, e.g. by a solder connection. This connection (wire 143) is used in the water presence detection process. The elements 133 and 143–144 are potted with a potting compound such as epoxy.

In operation previously described, the water detection system is normally held in a low state by the microcomputer output, which is turned off. When the microcomputer program turns the output on, or switches to a high state, if no water is present to form a conductive path, no change is detected at the output of op amp 90. However, if water is present, then the output of 90 changes state in response to state change of the output because of the conductive characteristic of water under electrical current. This circuit is activated for very short periods of time and then returned to an inactive or grounded state. An exemplary effective cycle could be for 5 milliseconds every 100 milliseconds. In addition, it may be advisable to change polarity on each sensor to prevent corrosion damaging one sensor to the point of destruction.

FIGS. 3 and 7A thus illustrate a combination sensor which uses the housing of the temperature sensor for the water presence detector. A separate pair of electrodes distinct from the temperature sensor is also within the scope of this invention, as is the concept of using the shell of the heater housing for one electrode, and an insulated, conductive probe, both hooked to a resistor divider network, as previously described.

Since the water presence detector has no moving parts, water may enter the heater housing from either end and flow out the other end. Generally, a pump has an inlet, or suction side, and an outlet, or pressure side. The heater assembly fitted with the water presence detector may therefore be fitted to either the suction or outlet side of the pump with equally satisfactory results. This flexibility is extremely valuable, as it allows exceptional latitude in the principal layout configuration of the pump and heater components for assembly into the spa.

Temperature information regarding the heater is gained through sensor thermistors 134 and 133, formed and placed generally adjacent to the heater element, and on either end of the heater element. As the thermistors change resistance in response to the immediate temperature surrounding, an electrical signal is generated at the output of op amps 97 and 89, through associated electrical circuitry. Resistors 88, 85 and capacitors 87 and 86 are configured to provide the current form of electrical input to provide a sensible voltage through the op amp. Each temperature sensor is configured in like manner. When water is flowing in the heater assembly, both temperature sensors will reach equilibrium and provide a proportionally equal voltage if the heater element 42 is not activated.

Under control of the microcomputer, if the heater element is energized, the physical location of the temperature sensors may then detect a different temperature of water between the inlet and the outlet of the heater housing. Depending on the actual set temperature of the controller, the microcomputer will elect to use the temperature of the lower, or inlet side sensor, as the actual temperature of the spa, and turn off the heater when the temperature of the spa is equal to the desired temperature of the spa.

If the water flow slows down to a point where there is a substantial difference between the inlet and outlet temperature, then the microcomputer can interpret this as a trouble signal and deactivate the heater. Further, if there is a blockage in the plumbing, or the pump fails to circulate water, the temperature in the heater housing may rise to unacceptable limits. Accordingly, op amps 105 and 104, not feeding into the microcomputer, but entirely independent circuit have a reference network of resistors which provides a precision reference voltage. When the input to either of the op amps 104, 105 exceeds the precision reference voltage, the output of the op amp swings appropriately to deactivate transistor 133 thereby causing gate 118 to change state, and causing relay driver 131 to turn off heater relays 130 and 129. The heater is therefore shut off and can only be reactivated by a manual reset signal from control panel 22, through the microcomputer, which changes state of gate 118. However, as long as either temperature sensor remains above a temperature set by the reference voltage networks, the manual reset signal cannot work. An exemplary appropriate temperature for the high limit circuit deactivation is between 118° F. and 122° F. to protect from injury. As long as a manual reset signal is not given, the circuit will remain in an off state.

Each described circuit is sensibly connected to the microcomputer 35, which has electrical inputs responsive to changes in voltage level from a logic high to a logic low. An exemplary embodiment employs a relatively sophisticated microcomputer, and 8 bit microcomputers and more powerful microcomputers can be employed. Typically an embodiment of this invention would employ a CMOS or complimentary metal oxide version of a microcomputer.

Because the temperature sensors 31 and 32 generate a voltage proportional to temperature, a device such as an analog to digital converter 99 is used to convert the analog voltage to a readily usable digital value which is provided at the microcomputer via customary means. In a preferred embodiment, the temperature measurement components are thermistors which are matched in their resistance versus temperature values. Typically, accuracies are available of 0.2° C. precision, meaning two thermistors held at a precise resistance value by varying the temperature of each independently will match within 0.2° C. of an equal temperature. By using thermistors of no more than 1° C. precision, the system will not require calibration of the hardware interface of the electrical signal of the thermistor temperature output. In addition, if the computer is able to circulate water through the system without activating the heater, the temperature sensors will be in the same temperature environment. Therefore, the computer will able to compare the readings of the sensors to determine if they are within the precision specified above, 1° C., and provide a software calibration for final correction.

Figure 7B:
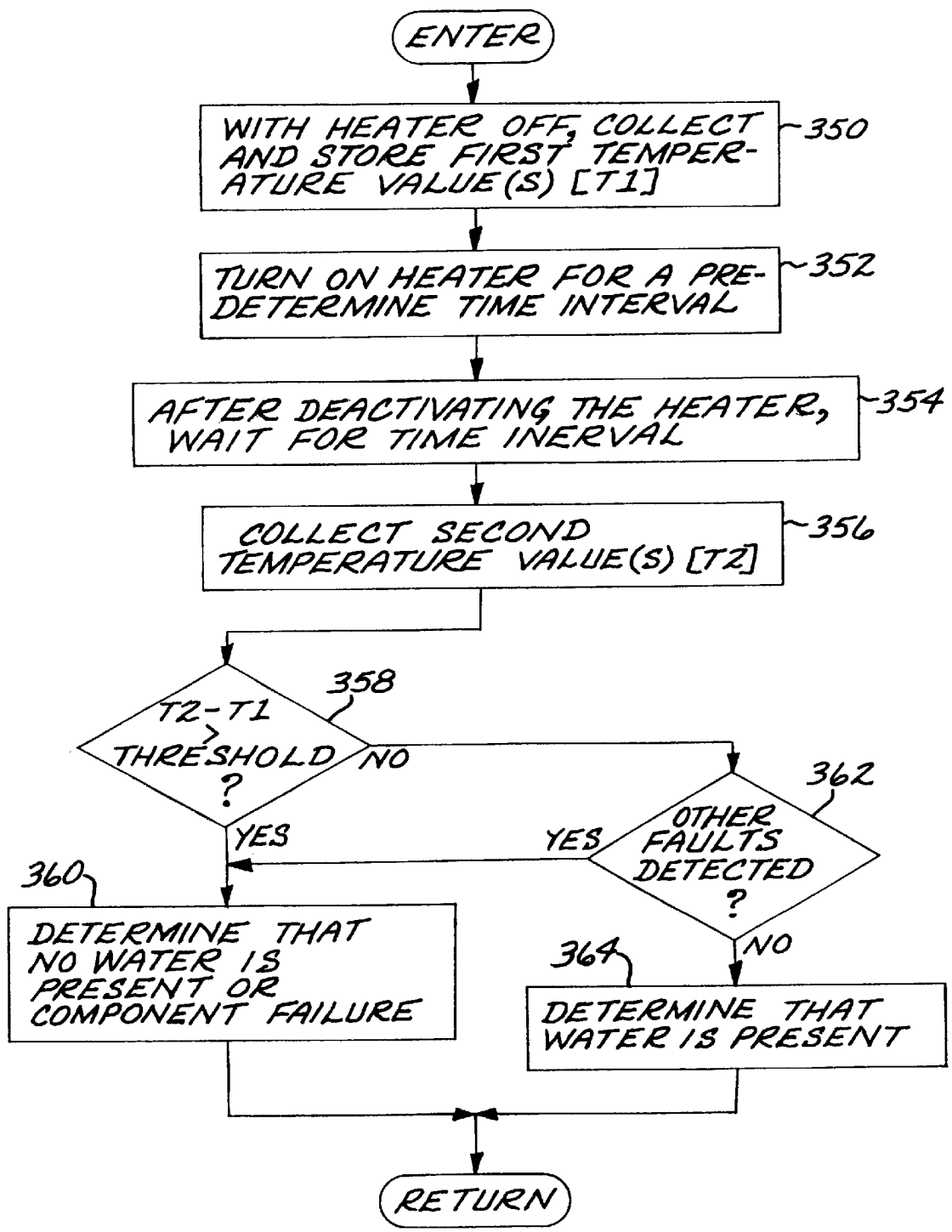
FIG. 7B is a simplified flow diagram illustrating a technique for detecting the presence of water in the heater housing.

An additional or alternative technique for sensing the presence of water in the heater housing is illustrated in the flow diagram of FIG. 7B. This embodiment senses the water flow, which will tend to cool the heater and temperature sensor assemblies. In the absence of water or water flow, with the heater energized, the temperature sensors will detect a significantly increased rate of temperature rise. This can then be used to determine that no water is present or that components have failed (e.g., water pump failure). While the water pump 1 is activated, the microprocessor 35 may activate the heater 3 for a selected period of time, say 4 seconds, deactivate the heater for a selected period of time, say one minute, and compare the temperature readings before the activation began to the readings after the selected off time interval. If the temperature difference exceeds a predetermined amount, say 10 degrees, then the heater can be determined by the microprocessor to have no water present in the housing. This technique is illustrated in FIG. 7B with a an operational subroutine executed by the microprocessor. The water pump is activated during the steps 350–356. At step 350, a first temperature reading at both of the temperature sensors is taken with the heater off. Then, the heater is turned on for a predetermined time interval (step 353) and then turned off. After another time interval has elapsed (step 354), a second temperature at reading is taken (step 356). The difference between the two readings for each temperature sensor is then taken, and compared to a threshold (step 358). If the difference for either sensor is greater than this threshold, then the microprocessor declares that no water is present or that there is a component failure (step 360). If the difference is not greater than the threshold, the microprocessor determines (step 362) whether any other faults have been detected, such as too large a differential between the temperature readings taken at the two sensors 31, 33 (described more fully below). If so, the operation branches to step 360. Otherwise, the microprocessor will determine that water is present in the heater housing (step 364).

Figure 4:
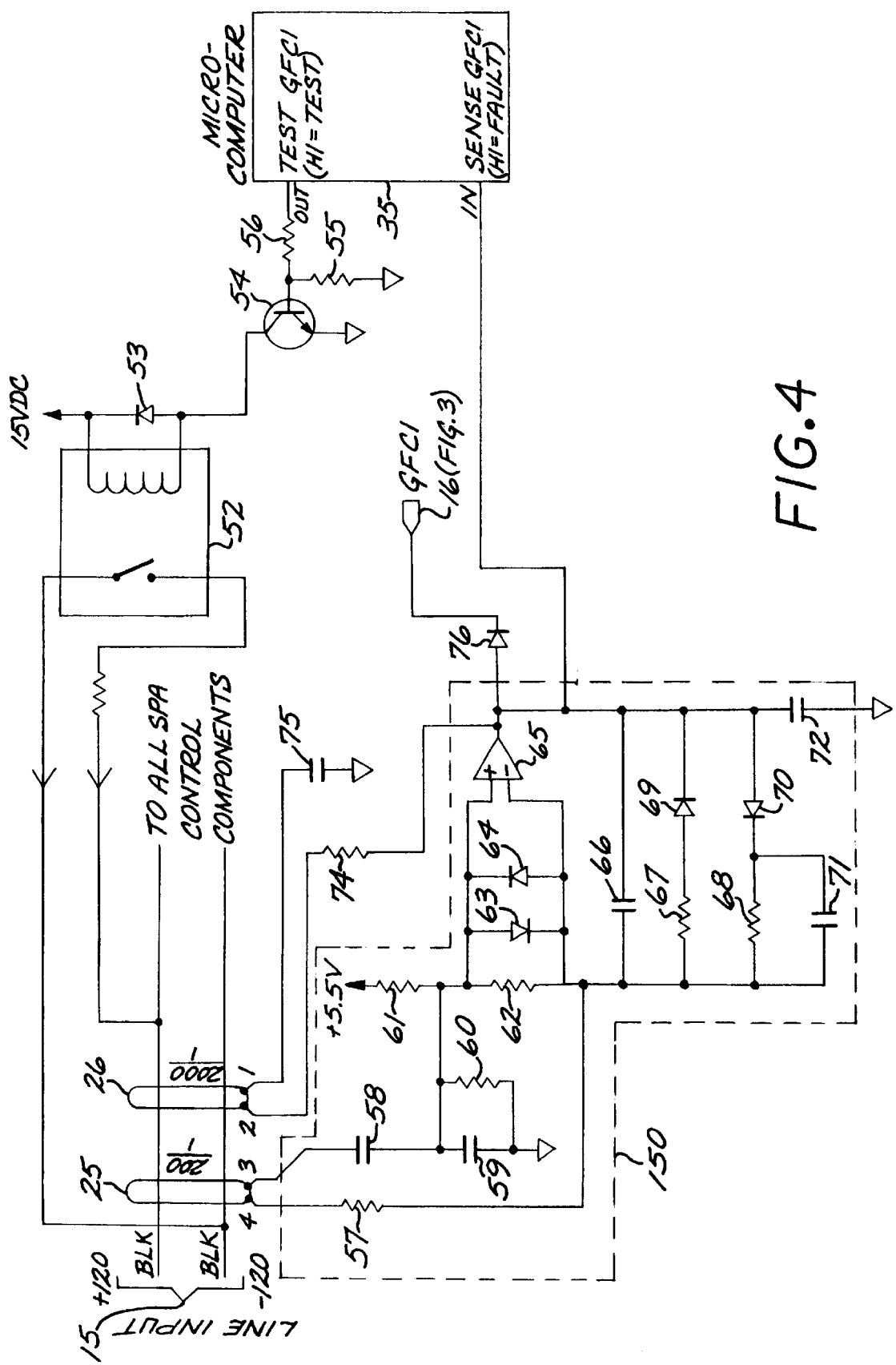
FIG. 4 is an electrical schematic diagram of one embodiment of a ground fault circuit interrupter circuit integrated into a system for bathers.

Shown in FIG. 4 is a Ground Fault Circuit Interrupter (GFCI) circuit. This electrical circuit is configured to be in close relationship with the electrical system which controls the spa equipment. The main power supply which supplies the current to the spa equipment and control is shown at 15, and passes through two torroids, shown at 25 and 26. As long as the net current flowing through the torroids is equal, the torroids see a no magnetic flux. However, if a device, such as a heater element fails, some current escapes through the earth ground, as at 16.

When an imbalance occurs, an electromagnetic coupling occurs which sets up an electrical current in the sense circuit 150 associated with the detection torroids. The circuit 150 outputs a fault or error signal proportional to current flow which is provided to the microcomputer (via analog-to-digital conversion, not shown in FIG. 4). The microcomputer then responds with an error message which is displayed on the control panel 22. In addition, a fault creates a change in state at output connection 116, which connects to 117 on FIG. 3. This connection activates the circuits generally beginning at diode 109. This in turn triggers transistor 133. Gate 118 changes state in response, deactivating relay driver 131 and opening relays 129 and 130d. Microcomputer 35 also opens all other relays, 36, disconnecting any other components, such as pumps, blowers and lights.

Microcomputer 35 can test the functionality of the GFCI circuit by outputting a signal through resistor 56, which activates transistor 54, closing relay 52. Current passes through resistor 23, bypassing torroids 25 and 26, imbalancing the current flowing through the torroids. This causes GFCI circuitry to trigger, providing a signal to microcomputer 35 that the circuit has properly triggered. When the microcomputer senses a trigger signal, it resets test relay 52 by restoring status to resistor 56. Because a GFCI fault triggers the high limit relays 129 and 130, opening them up, the microcomputer also generates a system reset signal on line 198 which re-enables the drivers which activate the relays 129 and 130. This sequence of events is carried on periodically, such as once per day, to verify the functionality of the GFCI circuit. Generally, a real time clock, functioning as a master timekeeper, would provide a reference signal and a programmed interval between tests, such as 24 hours could be set using techniques known by ones skilled in the art of microcomputer programming.

FIG. 5 illustrates a Ground Integrity Detector (GID) device. The Ground Integrity Detector includes a neon bulb 20 connected in series with a limiting resistor 43 from the power service voltage to the system earth ground 16. If the ground is properly connected, current will flow from the supply, through the limiting resistor. The current flow can be limited to less than one milliampere (ma). The light from the neon bulb is contained in a light tight enclosure 28, which also contains an opto-resistive device which falls in resistance in the presence of light. By connecting this opto-resistive device in a resistor divider circuit, shown generally at 46, a signal indicating the presence of light and therefore of a good ground, can be presented to the computer control system. The computer control system then manages this information according to instructions more fully described in FIG. 11.

Figure 6:
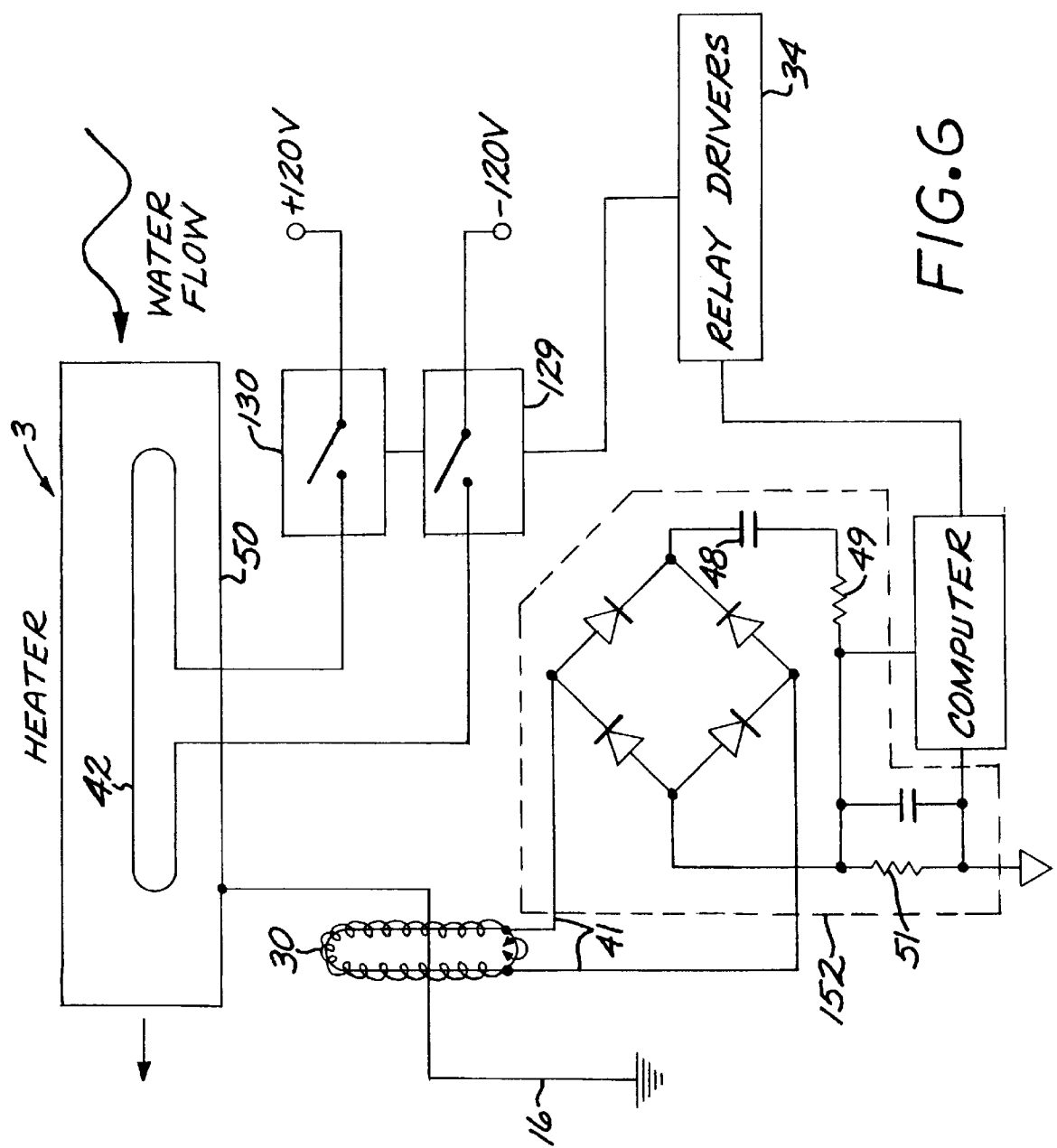
FIG. 6 is a schematic diagram of a Ground Current Detector circuit to identify and detect when current is flowing through the earth grounding circuit of the spa wiring.

Shown at FIG. 6 is a Ground Current Detector (GCD). The ground current detector is shown as capable of detecting currents which might flow in a ground attached to a heater current collector or shell 50 which is part of the heater assembly 3, including a heater element 42, and any other device powered or containing line voltage, such as lights, blowers and pumps, and the enclosure itself.

As an example, in normal service, heater elements 42 may fail and rupture due to either mechanical failure, corrosion, or electrical breakdown. The shell of the heater 50 then collects the current and routes it through the ground line, thereby protecting both the occupant of the spa and the equipment. However, if the current is allowed to flow indefinitely, there is a possibility of health hazard or equipment damage occurring. When current flows through the ground line 16, an electromagnetic coupling occurs between the current and the torroid 30 through which it passes. This coupling creates a voltage proportional to the current, and if the current is an AC current, an AC voltage will be induced in the torroid. When this voltage is provided to a full wave rectifier comprising sense circuit 152, a rectified DC signal is created. After conditioning this rectified DC signal with a capacitor 48 and resistor 49, a DC signal is generated proportional to current flow. (Alternatively, circuit 152 with its full wave rectifier can be replaced with a sense circuit similar to circuit 150 (FIG. 4), producing an error signal proportional to current flow.) When no current is flowing, the bleed resistor 50 insulates the circuit from the electrical noise. The computer control 35 consistently monitors the state of the input signal line from the GCD circuit. If a ground current is detected, the computer responds in accordance with instructions more fully explained in FIG. 11 to shut off the relays 36 through relay drivers 34 to reduce hazards to equipment and personnel.

Referring now to computer flow diagrams at FIGS. 8–13, the functional interrelation of the various prior described components is disclosed. These flow diagrams illustrate the action which is directed by the computer 35, as shown on FIG. 2A, responding to signals generated from the control panel 22 through interconnect cable 9. The microprocessor is programmed to accomplish the functions illustrated therein.

Figure 8:
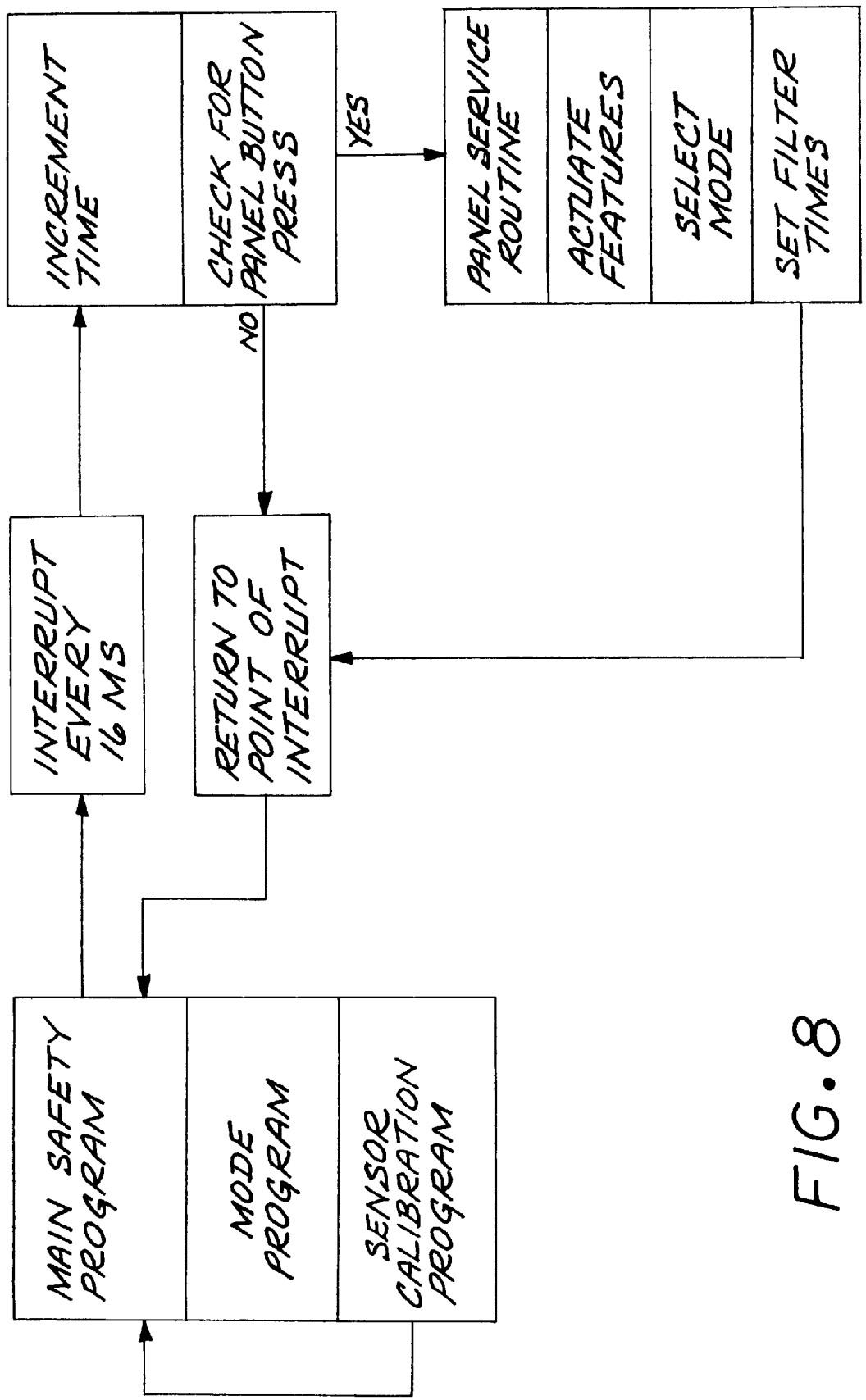
FIG. 8 illustrates a partial program structure showing relevant relationship of a main program block.
Figure 9:
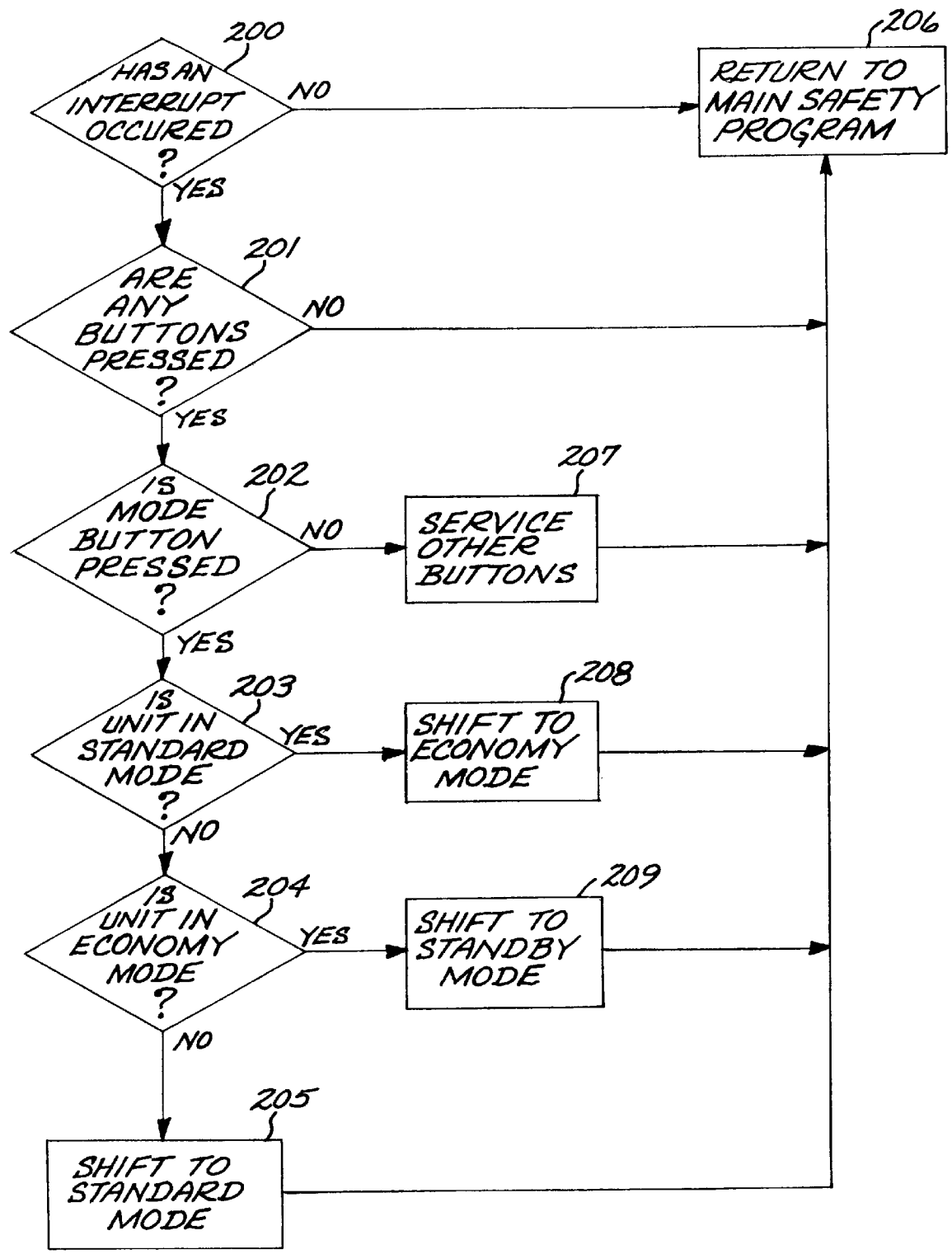
FIG. 9 is a flow diagram illustrative of a panel service program which responds to button activation to change operational modes of the spa.
Figure 10A:
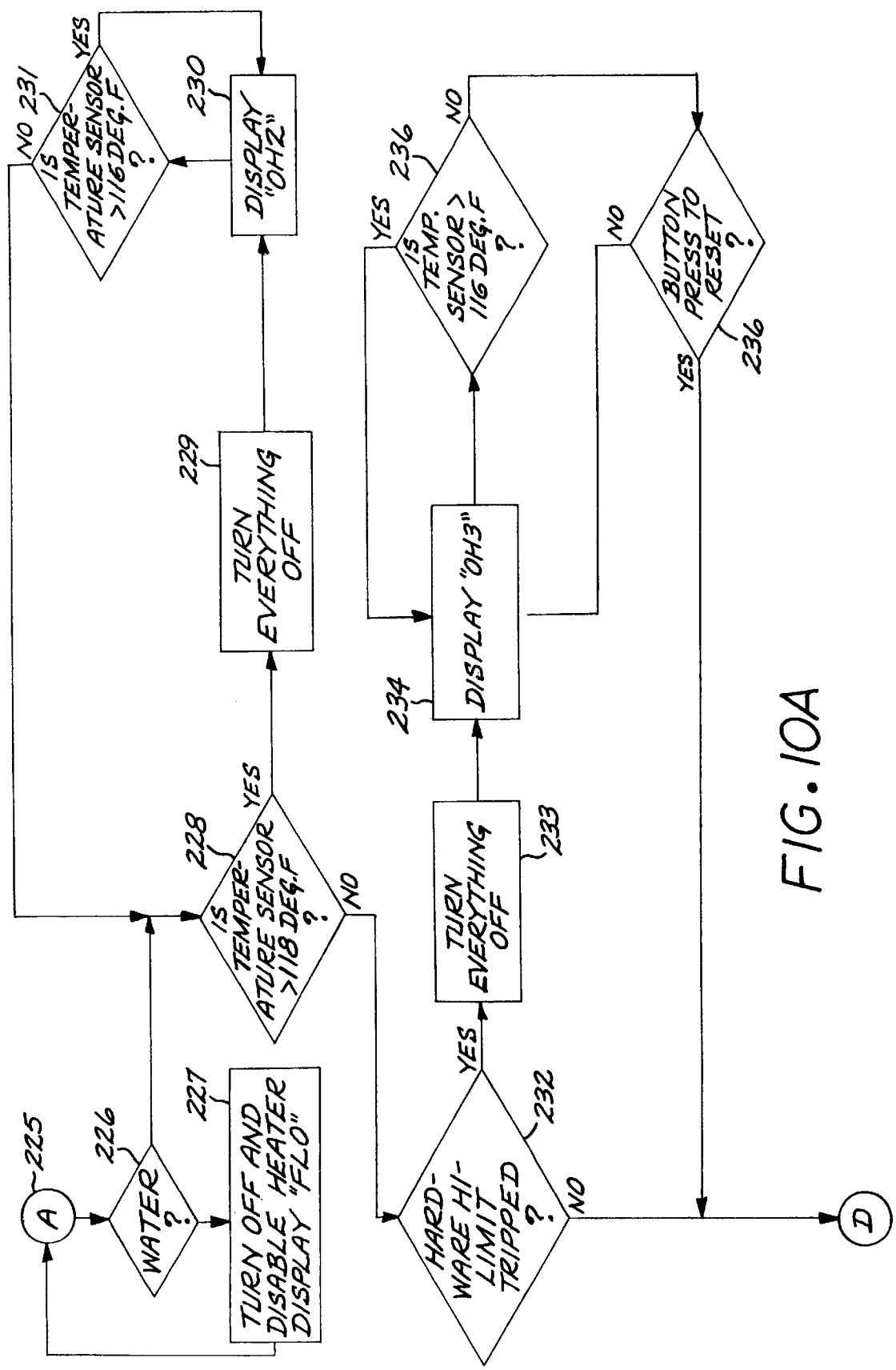
FIG. 10 is a flow diagram illustrating the operation of a safety circuit, temperature measurement and water detection method.
Figure 10B:
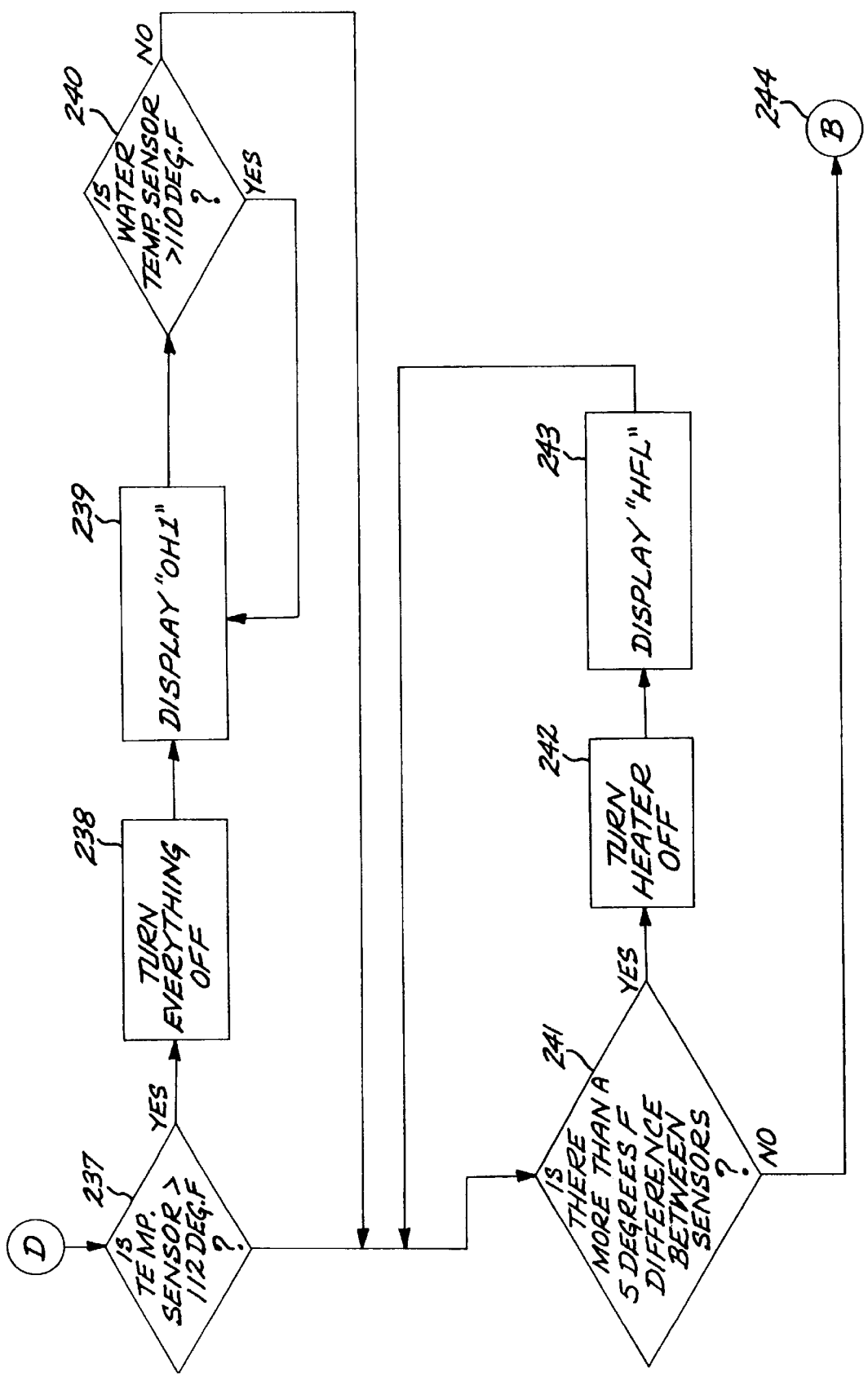

As shown in FIG. 8 in block form, and more fully disclosed in FIGS. 9–14, the spa control system computer is constantly running a safety and error detection program At any time in this program, a control panel signal can interrupt the program, branching off into the panel service program. When the mode button is pressed, the program branches into the "mode selection" routine, shown in FIG. 10. In the mode selection routine, one of three modes is selected, standard, economy or standby. Once a time interval has passed without further button presses, typically 3 seconds, the program reverts back to the safety program, looping through the proper "mode" program also. When the control system is first energized, it is default programmed to start in the economy (econ) mode.

To more fully describe the process diagrammed, the steps are described below.

FIG. 10

Step 225. Starting point of the program for flow chart purposes. Program normally initializes by known means to clear and reset all registers upon power up.

Step 226. Check for presence of water in heater. If none, branch to 227, otherwise branch to 228.

Step 227. Disable heater and loop back to 226.

Step 228. Check for software set high limit of 118° F. If temperature at either temperature sensor exceeds this value, the heater is turned off. If less than 118° F., program loops to 232.

Step 229. Turn heater off.

Step 230. Display error message on control panel 8 of OH2 to signify overheat—at least 118° F.

Step 231. Remeasure temperature sensor. If temperature exceeds 116° F., program loops back to Step 229. If less than 116° F., program loops to Step 228.

Step 232. Check for hardware high limit, if tripped branch to 233, otherwise 237.

Step 233. Shut down system.

Step 234. Display error condition "OH3" for overheat hardware high limit.

Step 235. Measure water temperature. If less than 116° F., then branch to 236, otherwise branch to 233.

Step 236. Check for control panel input. If any button is pressed, system will reset.

Step 237. If water temperature is over 112° F., branch to 238, otherwise go to 241.

Step 238. Turn off everything—branch to 239.

Step 239. Display system error message "OH1" for overheat of at least 112° F.

Step 240. Remeasure water temperature, if less than 110° F., branch to 240, otherwise branch to 241.

Step 241. Check for balance between water temperature sensors. If a difference of greater than 5° F. exists, branch to 242, otherwise branch to 244.

Step 242. Turn heater off. Branch to 243.

Step 243. Display error message HFL, meaning the water flow in the heater is too low. Branch to 241.

Step 244. Proceed to 273.

FIG. 11

Step 273. If the heater is on, proceed to 274. If not, proceed to 340.

Step 340. Measure output of temperature sensor 1.

Step 341. Measure output of temperature sensor 2.

Step 342. Subtract lowest value from highest value.

Step 343. If the result is less than or equal to 1° F., then proceed to 345, otherwise proceed to 344.

Step 344. Send error message "CAL" to display on control panel. Proceed to 274.

Step 345. Store result in lowest sensor value register.

Step 346. Add contents of calibration register to all temperature measurement operations. Proceed to 274.

FIG. 12

Step 250. Has either sensor changed temperature more than 2° F./second? If so, proceed to 251, otherwise proceed to 253.

Step 251. Turn off heater, proceed to 252.

Step 252. Display "HTH1" error message for heater imbalance. Proceed to 250.

Step 253. Check proper input for ground integrity, that is, is the ground properly connected. If not, proceed to 254, otherwise branch to 256.

Step 254. Turn off system, proceed to 255.

Step 255. Display error message GR for ground disconnected or not properly hooked up. Proceed to 253.

Step 256. Check for ground leakage current. If none, proceed to 245. If yes, branch to 257.

Step 245. Is GFCI tripped? No, branch to 259. If yes, branch to 246.

Step 246. Shut down system and open all relays. Proceed to 247.

Step 247. Display GFCI error message indicating there is a ground circuit fault. Proceed to 248.

Step 248. Has system reset been pressed from control panel? If yes, loop to 245, otherwise loop to 247.

Step 257. Turn everything off. Proceed to 258.

Step 258. Display GRL error message to indicate ground leakage detected, proceed to 256.

Step 259. Check real time clock. If time is equal to 2:00 am, branch to 260, otherwise proceed to 266.

Step 260. Test ground fault interrupter circuit by closing relay to imbalance current in power supply.

Step 261. Check for GFCI system trip. If yes, proceed to 263, if no branch to 262.

Step 262. Turn off system, proceed to 265.

Step 265. Display error message GFCF for ground fault interrupter circuit failure, proceed to 261.

Step 263. Reset GFCI circuit via microprocessor reset, proceed to 264.

Step 264. Reset hi-limit circuit via microprocessor output. Branch to 266.

Step 266. Is either temperature sensor disconnected? If yes, 267. If no, 269.

Step 267. Turn everything off, proceed to 268.

Step 268. Display SND, loop to 266.

Step 269. Is either temperature sensor shorted? If yes, proceed to 270. If no, 275.

Step 270. Turn off system, proceed to 271.

Step 271. Display error message SNS. Loop to 269.

Step 275. Proceed to mode as selected by panel service program.

FIG. 13

Step 276. Program checks for function of pump 1 which circulates water through heater. If pump is already on, program proceeds to 282, otherwise program proceeds to 277.

Step 277. Check for 30 minute elapsed time. If pump has been off for less than 30 minutes, branch back to main safety program at 225. If pump has been off for 30 minutes, proceed to 227.

Step 278. If water temperature has dropped more than 1° F. below set temperature in the last hour, proceed to 281, if not, proceed to 279.

Step 279. Reset iteration counter to zero and proceed to 280.

Step 280. Reset 30 minute pump off timer and proceed to 225 main safety program.

Step 281. Turn pump on, proceed to 282.

Step 282. Allow pump to run for 30 seconds. If not, look back to main safety program 225. If so, proceed to 283.

Step 283. Read water temperature, proceed to 284.

Step 284. Check to see if 5 seconds has passed from beginning of water temperature read. If so, proceed to 285, otherwise loop back to 283.

Step 285. Compare water temperature to set temperature. If water temperature higher than set temperature, proceed to 286. If not, proceed to 287.

Step 286. Increment iteration counter, proceed to 290.

Step 287. If water temperature is more than 1° F. below set temperature, proceed to 288, otherwise proceed to 286.

Step 288. Reset iteration counters. Proceed to 289.

Step 289. Turn on heater, proceed to 225.

Step 290. Turn off heater, Proceed to 290.

Step 291. Turn off pump. Proceed to 294.

Step 294. Display last valid temperature. Proceed to 280.

Step 280. Reset 30 minute pump off timer. Proceed to 292.

Step 292. Has a button on control panel been pressed in the last 24 hours? If yes, branch to 225. If not, branch to 293.

Step 293. Shift to economy mode. Proceed to 225.

Step 225. Proceed to Safety Circuit Chart A.

FIG. 14

Step 275. Once selected by "mode" selection, main safety program branches into economy mode and proceeds to 300.

Step 300. Program checks for filter cycle. If filter pump is on, program branches to 301, otherwise to 225.

Step 301. Read temperature 1 and store.

Step 302. Read temperature 2 and store.

Step 303. Select lowest of the two temperature readings.

Step 304. If spa water temperature is equal or greater than set temperature, branch to 305; otherwise branch to 306.

Step 305. Turn heater off, proceed to 310.

Step 310. Display last valid temperature. Proceed to 308.

Step 306. Is spa more than 0.1 degree below set temperature? If yes, branch to 307, otherwise branch to 310.

Step 307. Turn heater on. Proceed to 310.

Step 308. Has a control panel button been pressed in the last 24 hours? If yes, branch to 225. If not, branch to 309.

Step 309. Shift to standby mode and proceed to 225.

FIG. 15

Step 275. Once selected by "mode" selection, main safety program branches into standby mode and proceeds to 325.

Step 325. Program checks for filter cycle. If filter pump is on, program branches to 326, otherwise to 225.

Step 326. Read water temperature 1 and proceed to 327.

Step 327. Need water temperature 2 and proceed to 328.

Step 329. Compare spa water temperature to 15 degrees below set temperature. If spa temperature is less than 15 degrees below set temperature, proceed to 328, otherwise 329.

Step 332. Turn on heater and proceed to 225.

Step 328. Select lowest of the two temperature readings and proceed to 329.

As can be seen from the foregoing specification and drawings, a spa control system is disclosed which is self contained with a plurality of sensors located adjacent the heater element for both temperature regulation and limiting. In the preferred embodiment, the heater and control system are attached together in adjacent proximity, as illustrated in FIG. 1 and FIG. 2B. This provides the greatest protection from mechanical hazards and facilitates the sensing of critical parameters, such as water temperature and water presence. In this preferred embodiment also, a microcomputer is the central processing unit, which receives data from a plurality of sensors in and adjacent to the heater, which provides data for the intelligent management of the user's desires. These user's desires are provided to the control microcomputer via control panels which provide a plurality of easy access for activating functions and features of the spa.

Additionally, integrated as a part of the system interconnect board in the control system, are not only the microcomputer, but also the safety circuity which detects and monitors the integrity of the system ground. In addition, as shown in FIG. 2A, there is a ground fault circuit interrupter circuit which shuts down the system when an insulation failure occurs and there is a short to the bather's water of voltage. All of these functions are self-contained within the control system circuitry and heater, and require no other connection than pumping from or to a pump, power hookup with a ground, and a control panel connection.

In the installation of such a preferred embodiment at the factory, ease of assembly into the spa is facilitated by eliminating external temperature sensors employed in previously known systems, since the sensors are contained within the system enclosure and heater assembly (FIG. 2B).

Also eliminated are any calibration requirements for mechanical switches and sensors which might need adjustments. Pumps, blowers and lights are plugably connected to the control system. The user is protected from connection to the supply voltage by the containment of all electrical components within the heater housing and enclosure structure, which is hooked to earth ground.

When the control system is initially energized, the microprocessor checks for presence of water, and if present, starts the pump. As described above, the presence of water can be detected in accordance with aspects of the invention by either the use of water as a conductor, and detecting the flow of electrical current through the water, and/or by use of the technique described with respect to FIG. 7B. (Of course, other water detection techniques could also be employed in the system of FIG. 1, including the conventional mechanical, optical or ultrasonic flow sensors.) If the routine of FIG. 7B is repeated at a slow enough cycle rate, the system will not overheat. If repeated loops through this software routine are executed at frequent intervals, and no water is present, the temperature of one of the temperature sensors will eventually exceed 118° F., and the hardware high limit circuit will shut down certain aspects of the controller, including the heater as at step 228. As an alternative to waiting for the hardware high limit circuit to shut down powered elements, the first detection of a temperature difference exceeding a predetermined amount, or the occurrence of other faults, can be treated by the controller 35 as a serious fault condition, with the controller causing shutdown of all output relays (e.g. step 362 of FIG. 7B). The system may be configured to require a manual restart to be returned to normal operation.

After the water presence test has determined that water is present in the heater housing, the microprocessor reads the temperature sensors, calibrates them, and upon determination that all sub-systems of the control system are within tolerance, starts up the heater, if necessary. When the spa water reaches the set temperature, the heater is turned off, and once the heater element has cooled down, the pump is turned off. Every selected time period, the pump is started up, drawing water through the heater and temperature sensor array. If heat is needed to hold the spa water at the desired temperature, the heater is turned on. If not, then the pump is shut down for a time interval. This time interval is adjusted based on the rate of heat loss from the spa. If the rate of loss is low, the time interval can be extended to reduce wear on the pump.

The spa is generally started in the standard mode, where the set temperature is maintained by the controller as described. When the pump is not running, the temperatures the sensors read do not necessarily reflect the actual spa temperature, due to changes in temperature in the spa equipment environment. Therefore, the last known valid temperature is displayed on the control panel, and it does not change until the pump starts up and runs again on its time interval circulation to check spa temperature.

If the user of the spa has not activated a feature of the spa for a period of time, via the control panel, say 12 hours, the spa can automatically shift into a lower energy consumption state, shown as "economy," where the set temperature is only reached when the spa is filtering. Again, if no activity is experienced at the control panel, the spa can automatically shift into an even lower energy consumption state, the "standby" mode. In the "economy" mode, the last known valid temperature is displayed while the filter pump is not running, and actual temperature is displayed when the pump is running. To warn the user of the mode selection, the display of temperature is alternated with the message "econ".

When in the standby mode, no temperature is displayed, just the message "stby", and the spa pump is filtered on user set or default cycles. The heater is activated only to maintain the spa water at 15 to 20° F. below the set temperature to reduce energy consumption and the need for sanitation chemicals.

At any time, if the proper ground is damaged or removed from the spa, the microprocessor disconnects the peripheral equipment, including the heater, and provides an error message to the control panel to warn the users, and provide a diagnostic message to assist in curing the problem. This is accomplished by the GID, FIG. 5. If there is an actual short to ground through the ground wire, the system can be shut down by either a ground current detector as in FIG. 6, or a ground fault circuit interrupter, as in FIG. 4.

If there is an over heat condition, the various software detection methods shut off the heater, but if there is a high limit value of over 118–122° F., the system trips the electronic hookup high limit associated with each temperature sensor. This opens a different set of relays from the temperature regulation relays, shutting down the heater until the temperature falls below a safe temperature, and the system is re-set from the control panel.

A detailed reference summary for exemplary elements shown in the figures for the exemplary embodiment follows:

FIG. 1

Reference Description

1 Spa with water
2 Electronic control system
3 Heater assembly
4 Pump 1
5 Pump 2
6 Air blower
7 Light
8 Control panel
9 Control panel connecting cable
10 Auxiliary control panel
11 Auxiliary control panel cable
12 Spa skimmer
13 Spa water pumping
14 Electrical cable interconnect
15 Electrical service supple cable
16 Earth ground
17 Suction fitting
18 Jet therapy fitting
19 Air blower supply pipe

FIG. 2A

Reference Description

21 Display of information
22 Panel touch pads
23 Main circuit board
24 Isolation transformer
25 GFCI Torroid 1
26 GFCI Torroid 2
27 GFCI circuitry
28 Ground Integrity
29 Ground Current Detector
30 GCD Torroid
31 Sensory Assembly 1, temp & $H_2O$ detect
32 Sensory Assembly 2, temp & $H_2O$ detect
33 High limit circuit
34 Relay drivers
35 Microcomputer
36 Relays
37 Heater power interconnect
38 GFCI Torroid 1 interconnect
39 GFCI Torroid 2 interconnect
40 Temp sensor interconnect
41 GCD Torroid interconnect
42 Heater element

FIG. 3

Reference Description

22 Control panel
3 Heater assembly
16 Earth ground
31, 32 Temperature sensor assembly
44, 77 Electrical connection leads
78, 79, 82, 83 Resistor 430 kohm
80, 81 Resistor 820 kohm
84, 115 Resistor 10 kohm
113,112,85,94,98,107 Resistor 20 kohm
86, 92 Capacitor 0.1 microfarad
87, 93 Capacitor 22 microfarad
88, 95 Resistor 2 kohm
122,89,97,104, 105 Op Amp LM324
90 Op Amp LM662
91 Resistor 68 kohm
96, 103 Resistor 1 kohm
99 MC145041 A/D converter
110, 118 4081 B Gate
101, 108 12-7 kohm resistor
102, 106 1 meg ohm
109, 110, 111 Diode 1N4003
114 Capacitor 1.0 microfarad
140 Diode 1N4754
117 Circuit connection to FIG. 4
119 Resistor 4–99 kohm
120 Resistor 6 kohm
121 Thermal cutoff
123 LED red.
124 Output to heater
125 Power into heater
126 Heater relay
127 Output to heater
128 Power into heater
129, 130 High limit relay
131, 132 Darlington relay drivers
133 Transistor 2N2222

FIG. 4

Reference Description

25 Torroid 1/200
26 Torroid 1/1000
35 Computer
52 Relay D&B T90
53, 76 Diode 1N4003
54 Transistor 2N2222
55 Resistor 20K
56 Resistor 2K
57 Resistor 200 ohm
58 Capacitor 22 uf
59, 72 Capacitor 0.001 uf
60 Resistor 100 kohm
61 Resistor 220 kohm 62, 67 Resistor 260 kohm
63, 64, 69, 70 Diode 1N914
65 Operational amplifier 4M324
66 Capacitor 33 pf
68 Resistor 3.3 meg ohm
71 Capacitor 0.1 uf
73 Resistor 15K
74 Resistor 470 ohm
75 Capacitor 0.01 uf
150 Sense circuit

FIG. 5

Reference Description

43 Neon bulb limiting resistor
44 Photo resistor
45 Circuit ground
46 +5 volts
42 Heater element
3 Heater assembly
50 Heater housing
36 Relays
16 Earth ground
28 Ground integrity detector housing
35 Microcomputer
20 Neon bulb

FIG. 6

Reference Description

47 Bridge rectifier, 1 amp
48 Capacitor, 22 uf
49 Resistor, 10 kohm
50 Heater housing
51 Bleed resistor, 100 kohm
42 Heater element
3 Heater housing
36 Relay
30 Torroid 1/1,000 turns
16 Earth ground
34 Relay drivers
45 Circuit ground
35 Microcomputer
152 Sense circuit

FIG. 7A

Reference Description 31 temperature sensor assembly
31A sensor housing
31B insulating bushing
142 potting compound
143 wire
144 wires The embodiments shown are merely illustrative of the present invention. Many other examples of the embodiments set forth above and other modifications to the spa control system may be made without departing from the scope of this invention. It is understood that the details shown herein are to be interpreted as illustrative and not in a limiting sense.

What is claimed is:

1. A heating and control system for bathers, comprising:
   an electronic controller;
   an electric heater assembly connected in a water flow path for heating water passing therethrough, comprising a heater housing and electric heater element, the controller arranged to control the operation of the heater element;
   water temperature sensor apparatus providing electrical temperature signals to the controller indicative of water temperature at separated first and second locations on or within said heater housing or a combination thereof;
   water presence sensor apparatus to determine the presence or absence of water within said heater housing, and to provide electrical water presence signals to the controller indicative of the presence or absence of a body of water within the heater housing;
   the controller responsive to signals from the water temperature sensor apparatus and the electrical water presence signals to control the heater element, said controller responsive to said electrical water presence signals indicating the absence of a body of water within the heater housing to disable operation of the heater element, and to automatically enable operation of the heater element upon subsequent receipt of water presence signals indicating the presence of a body of water within the heater housing.

2. A system according to claim 1 wherein said controller energizes the heater assembly only when the temperature sensed at said first location and the temperature sensed at said second temperature location are within predetermined limits.

3. A system according to claim 1 wherein the water presence sensor apparatus comprises a solid state sensing device.

4. A system according to claim 3 wherein the solid state sensing device comprises apparatus for passing an electrical sensing signal through the body of water if present within the heater housing, and a detector circuit to detect said electrical sensing signal.

5. A system according to claim 4, wherein the detector circuit generates said electrical water presence signals indicative of the presence or absence of a body of water within the heater housing.

6. A system according to claim 1, wherein the water presence sensor apparatus employs the electrical conductivity of a body of water within the heater housing to detect the presence or absence of the body of water therein.

7. A system according to claim 1, wherein the water presence sensor apparatus is free of any moving mechanical parts.

8. A system according to claim 1 wherein the water presence sensor apparatus comprises the controller and said water temperature sensor apparatus, and wherein the controller collects temperature values before and after operating the heater assembly for a given time interval, and determines whether water is present as a result of the difference in the before and after temperature values.

9. A system according to claim 1 wherein the water temperature sensor apparatus comprise a plurality of solid state temperature probes.

10. A system according to claim 1, further including a controller enclosure, and wherein the controller includes a controller circuit board within the controller enclosure, and wherein the heater assembly is attached to the controller enclosure.

11. A system according to claim 1, wherein the first location is at or adjacent a water entrance of the heater assembly, and the second location is at or adjacent a water exit of the heater assembly.

12. A system according to claim 1 wherein said controller energizes the heater assembly only when the temperature sensed at said first location and the temperature sensed at said second temperature location are within predetermined limits.

13. A system according to claim 1 wherein the controller deactivates operation of said heater assembly if said water temperature sensor apparatus detects a temperature rate of rise at said first location or at said second location that exceeds a certain specified value.

14. A system according to claim 1 wherein the controller compares the respective temperatures detected at said first and second locations and uses the lower of said temperatures to control the activation and deactivation of the heater.

15. A system according to claim 1, further comprising a pump for circulating water through the heater assembly, the pump controlled by the controller.

16. A system according to claim 15 wherein the pump has a water input and a water output, and wherein the water output of said pump is directed into said heater assembly.

17. A system according to claim 15 wherein the water input of said pump is through the heater assembly.

18. A system according to claim 3 wherein the controller deactivates operation of said heater assembly if said water temperature sensor apparatus detects a temperature rate of rise at said first location or at said second location that exceeds a certain specified value.

19. A system according to claim 3 wherein the controller compares the respective temperatures detected at said first and second locations and uses the lower of said temperatures to control the activation and deactivation of the heater.

20. A heating and control system for bathers for heating water, comprising:
   a control circuit board assembly comprising at least one power switching device;
   a high voltage power supply connected to said control circuit board assembly;
   a control panel for inputting user preferences;
   a heater assembly comprising a heater housing element connected to said control circuit board assembly;
   a first water pump connected to said control circuit board assembly;
   a microprocessor coupled to said control panel and to said control circuit board assembly, said microprocessor adapted to process signals from a plurality of devices providing water parameter information and to energize said heater according to user preferences;
   a water presence sensor apparatus for detecting the presence of water in said heater housing element;
   a water temperature sensor apparatus for providing electrical temperature signals to the controller indicative of water temperature at separated first and second. locations on or within said heater housing or a combination thereof; and
   independent circuit apparatus connected to said water temperature sensor apparatus and to said at least one power switching device, said independent circuit apparatus for automatically causing the high voltage power to be disconnected from the heater assembly when the water temperature exceeds a predetermined temperature, said independent circuit apparatus requiring a manual reset once the water temperature has dropped below a predetermined level to allow the high voltage power to be reconnected to the heater assembly.

21. A system according to claim 20, wherein the temperature sensor apparatus includes a first temperature sensor for sensing a first water temperature at a first location and a second temperature sensor for sensing a second water temperature sensor at a second location, wherein said independent circuit apparatus includes a first separate circuit responsive to the first temperature sensor for disconnecting the heater when the first temperature exceeds said predetermined temperature, and a second separate circuit responsive to the second temperature sensor for disconnecting the heater when the second temperature exceeds said predetermined temperature.

22. A system according to claim 20 with a second water pump or an air blower connected to said control circuit board assembly, said first pump activated whenever said second pump or air blower is activated.

23. A system according to claim 22 wherein said second pump or said air blower is deactivated whenever said water temperature exceeds a certain amount.

24. A system according to claim 20, wherein the water presence sensor apparatus is a solid state system free of any moving mechanical parts.

25. A heating and control system for bathers, comprising:
   a control circuit board assembly comprising at least one power switching device;
   a high voltage power supply connected to control circuit board assembly;
   a heater assembly including a heater housing and heater element, said heater element connected to said control circuit board assembly;
   a microprocessor adapted to process signals from a plurality of input devices providing information regarding water parameters and to energize said heater according to user preference;
   a water temperature sensor apparatus for providing electrical temperature signals to the microprocessor indicative of water temperature at separated first and second locations on or within said heater housing or a combination thereof;
   independent circuit apparatus separate from said microprocessor and connected to the water temperature sensor apparatus and connected to at least one power switching device in the control circuit board assembly;
   said independent circuit apparatus automatically causing the high power supply to be disconnected from the heater assembly when the temperature exceeds a predetermined temperature, said circuit apparatus requiring a manual reset once the temperature has dropped below a predetermined level.

26. A system according to claim 25, wherein the temperature sensor apparatus include a first temperature sensor for sensing a first water temperature at a first location and a second temperature sensor for sensing a second water temperature sensor at a second location, and wherein the independent circuit apparatus including a first separate circuit responsive to the first temperature sensor for disconnecting the heater when the first temperature exceeds said predetermined temperature, and a second separate circuit responsive to the second temperature sensor for disconnecting the heater when the second temperature exceeds said predetermined temperature.

27. A system according to claim 25 including a control panel mounted within user access on the spa, said control panel containing a user-activated device to activate a reset of said independent circuit apparatus.

28. A spa including a heating and control system for bathers, comprising:
   an outdoor vessel for holding a body of water, the vessel intended to maintain the body of water in a substantially filled condition;

a control circuit board assembly;

a high voltage power supply connected to the control circuit board assembly;

a heater assembly physically connected to the control circuit board assembly;

water presence sensor apparatus to determine the presence of water within the heater assembly and provide water presence signals indicative of the presence or absence of a body of water within the heater assembly;

a pump for recirculating water through said heater assembly and said vessel;

water temperature sensor apparatus providing electrical temperature signals indicative of water temperature at separated first and second locations on or within said heater assembly;

an electronic controller comprising said control circuit board assembly for selectively activating and deactivating said pump at selected time intervals, said controller responsive to said temperature signals and said water presence signal to manage water parameters, said controller configured to disable operation of said heater in the absence of water within the heater assembly, and to automatically enable operation of the heater element upon subsequent receipt of water presence signals indicating the presence of a body of water within the heater housing.

29. A system according to claim 28 whereby said time intervals are determined by calculating the rate of heat loss of the spa.

30. A system according to claim 28 whereby said time intervals are varied to minimize the number of iterations of activation and deactivation of the pump.

31. A system according to claim 28 whereby the pump is activated for a short interval of time, and then deactivated if the temperature of the water is within a specified range of a selected temperature.

32. A system according to claim 28 wherein the electronic controller comprises a microprocessor connected to the control circuit board assembly.

33. A system according to claim 28 wherein the water presence sensor apparatus comprises the controller and said water temperature sensor apparatus, and wherein the controller collects temperature values before and after operating the heater assembly for a given time interval, and determines whether water is present as a result of the difference in the before and after temperature values.

34. A system according to claim 28 wherein said controller energizes the heater assembly only when the temperature sensed at said first location and the temperature sensed at said second temperature location are within predetermined limits.

35. A system according to claim 28 wherein the controller deactivates operation of said heater assembly if said water temperature sensor apparatus detects a temperature rate of rise at said first location or at said second location that exceeds a certain specified value.

36. A system according to claim 28 wherein the controller compares the respective temperatures detected at said first and second locations and uses the lower of said temperatures to control the activation and deactivation of the heater.

37. A method for detecting the presence of water in a system including a heater element, a heater housing, and a microcomputer, the microcomputer controlling the heater, at least one temperature sensor in close proximity to the heater element, the temperature sensor feeding temperature data to the microcomputer, the method comprising:

collecting and storing a first temperature measurement value;

activating the heater element for a predetermined time interval;

deactivating the heater element for a selected time interval;

collecting and storing a second temperature measurement value;

calculating the difference between the first temperature measurement value and the second temperature measurement value;

comparing the resulting difference to a predetermined value to establish the presence or absence of water adjacent the heater element.

38. A method according to claim 37, wherein said at least one temperature sensor includes first and second temperature transducers, and said first and second temperature values are respectively collected from said first and second temperature transducers.

39. A method according to claim 38 wherein said first and second temperature transducers are in thermal contact with said heater housing.

40. A method according to claim 37, further characterized in that the at least one temperature sensor is in thermal contact with the heater housing.

41. A heating and control system for bathers, comprising:

an electronic controller;

an electric heater assembly connected in a water flow path for heating water passing therethrough, comprising a heater housing and electric heater element, the controller arranged to control the operation of the heater element;

water temperature sensor apparatus providing electrical temperature signals to the controller indicative of water temperature at separated first and second locations on or within said heater housing or a combination thereof; and a water presence sensor apparatus to determine the presence or absence of water within said heater housing, the water presence sensor apparatus comprising the controller, and wherein the controller collects temperature values before and after operating the heater assembly for a given time interval, and determines whether water is present as a result of the difference in the before and after temperature values.

* * * * *